United States Patent
Shimoyama et al.

(10) Patent No.: US 9,963,121 B2
(45) Date of Patent: May 8, 2018

(54) WIPER BLADE

(71) Applicant: MITSUBA Corporation, Gunma (JP)

(72) Inventors: Masayuki Shimoyama, Gunma (JP);
Satoshi Ishikura, Gunma (JP);
Masayuki Arima, Gunma (JP);
Daisuke Kobayashi, Gunma (JP)

(73) Assignee: MITSUBA CORPORATION, Gunma (JP)

( * ) Notice: Subject to any disclaimer, the term of this patent is extended or adjusted under 35 U.S.C. 154(b) by 652 days.

(21) Appl. No.: 14/361,454

(22) PCT Filed: Nov. 28, 2012

(86) PCT No.: PCT/JP2012/080720
§ 371 (c)(1),
(2) Date: May 29, 2014

(87) PCT Pub. No.: WO2013/080997
PCT Pub. Date: Jun. 6, 2013

(65) Prior Publication Data
US 2014/0331434 A1  Nov. 13, 2014

(30) Foreign Application Priority Data

Dec. 2, 2011 (JP) ................. 2011-264328

(51) Int. Cl.
*B60S 1/52* (2006.01)
*B60S 1/38* (2006.01)
*B60S 1/40* (2006.01)

(52) U.S. Cl.
CPC .............. *B60S 1/524* (2013.01); *B60S 1/381* (2013.01); *B60S 1/3862* (2013.01); *B60S 1/4009* (2013.01)

(58) Field of Classification Search
CPC .. B60S 1/52; B60S 1/524; B60S 1/522; B60S 1/482; B60S 1/381; B60S 1/3862
(Continued)

(56) References Cited

U.S. PATENT DOCUMENTS 1,874,758 A * 8/1932 Ketchledge ............... B60S 1/50
15/250.04
2,348,502 A * 5/1944 Smulski .................. B60S 1/524
15/250.04
(Continued)

FOREIGN PATENT DOCUMENTS

DE       102007062304    *  6/2009
DE    10 2009 004 943       7/2010
(Continued)

OTHER PUBLICATIONS

Machine translation of description portion of French publication 2929906, published Oct. 16, 2009.*
(Continued)

*Primary Examiner* — Gary Graham
(74) *Attorney, Agent, or Firm* — Wenderoth, Lind & Ponack, L.L.P.

(57) ABSTRACT

A wiper blade includes a blade rubber and a rubber holder. In the rubber holder, a water channel through which a washing liquid flows along a longitudinal direction is provided. In the rubber holder, an injection port that communicates with the water channel and is configured to be opened by water pressure and inject the washing liquid is provided. The injection port is formed into a slit shape, and a plurality of injection ports are provided in the longitudinal direction. A width of the injection ports varies along the longitudinal direction, and the injection port closer to an outer end side has a larger slit width. A larger amount of the washing liquid is injected from the injection port having a larger slit width, and the injection amount of the washing
(Continued)

liquid becomes larger toward the outer end side at which more washing liquid is required.

2 Claims, 20 Drawing Sheets

(58) Field of Classification Search
USPC .......................................................... 15/250.04
See application file for complete search history.

(56) References Cited

U.S. PATENT DOCUMENTS

| | | | | |
|---|---|---|---|---|
| 3,418,676 | A * | 12/1968 | Byczkowski | ......... B60S 1/3415 |
| | | | | 15/250.04 |
| 3,854,161 | A * | 12/1974 | Benson | .................. B60S 1/524 |
| | | | | 15/250.04 |
| 4,285,470 | A * | 8/1981 | Roth | .................... B60Q 1/0017 |
| | | | | 15/250.002 |
| 5,383,247 | A * | 1/1995 | Nickel | .................... B60S 1/488 |
| | | | | 15/250.01 |
| 6,092,259 | A * | 7/2000 | Reppert | .................... B60S 1/20 |
| | | | | 15/250.04 |
| 2007/0089257 | A1 * | 4/2007 | Harita | .................. B60S 1/3801 |
| | | | | 15/250.04 |
| 2008/0216274 | A1 | 9/2008 | Egner-Walter et al. | |
| 2010/0037415 | A1 | 2/2010 | Lansinger | |
| 2012/0198646 | A1 * | 8/2012 | Kempfer | ............... B60S 1/3808 |
| | | | | 15/250.04 |

FOREIGN PATENT DOCUMENTS

| | | |
|---|---|---|
| DE | 10 2009 017 990 | 10/2010 |
| FR | 2 929 904 | 10/2009 |
| FR | 2929906 A1 * | 10/2009 |
| JP | 62-28662 | 2/1987 |
| JP | 5-507896 | 11/1993 |
| JP | 10-502313 | 3/1998 |
| JP | 2008-546596 | 12/2008 |
| JP | 2010-524749 | 7/2010 |
| WO | 96/01755 | 1/1996 |
| WO | 2007/000346 | 1/2007 |
| WO | 2008/052961 | 5/2008 |
| WO | 2010/022032 | 2/2010 |

OTHER PUBLICATIONS

English translation of the International Preliminary Report on Patentability dated Jun. 3, 2014 in International (PCT) Application No. PCT/JP2012/080720.

International Search Report (ISR) dated Feb. 26, 2013 in International (PCT) Application No. PCT/JP2012/080720.

* cited by examiner

[FIG. 1]
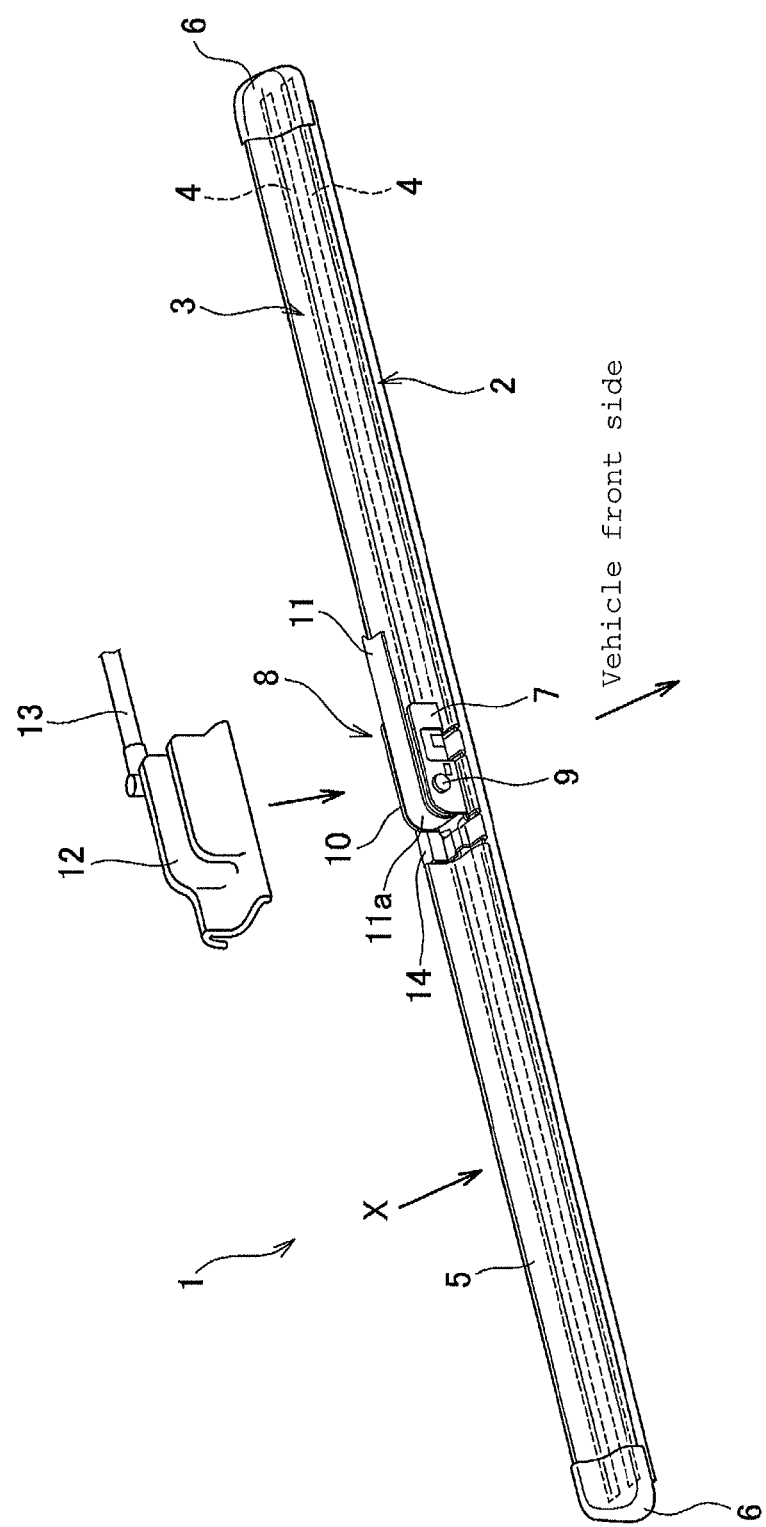

[FIG. 2]
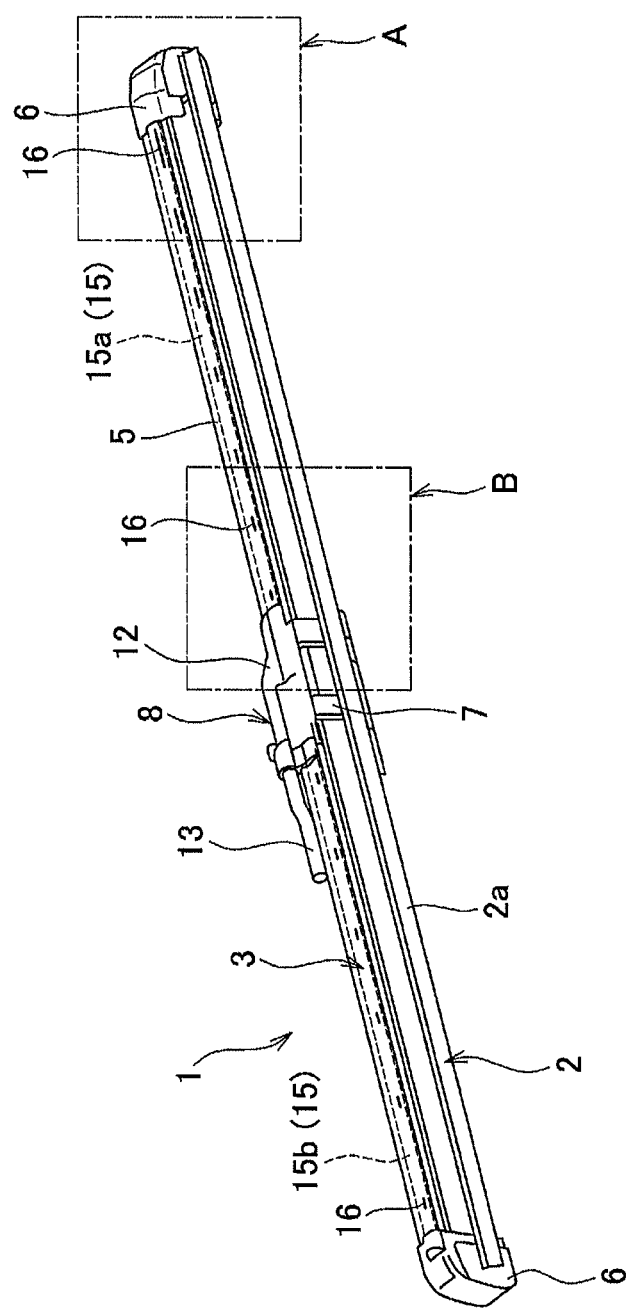

[FIG. 3]
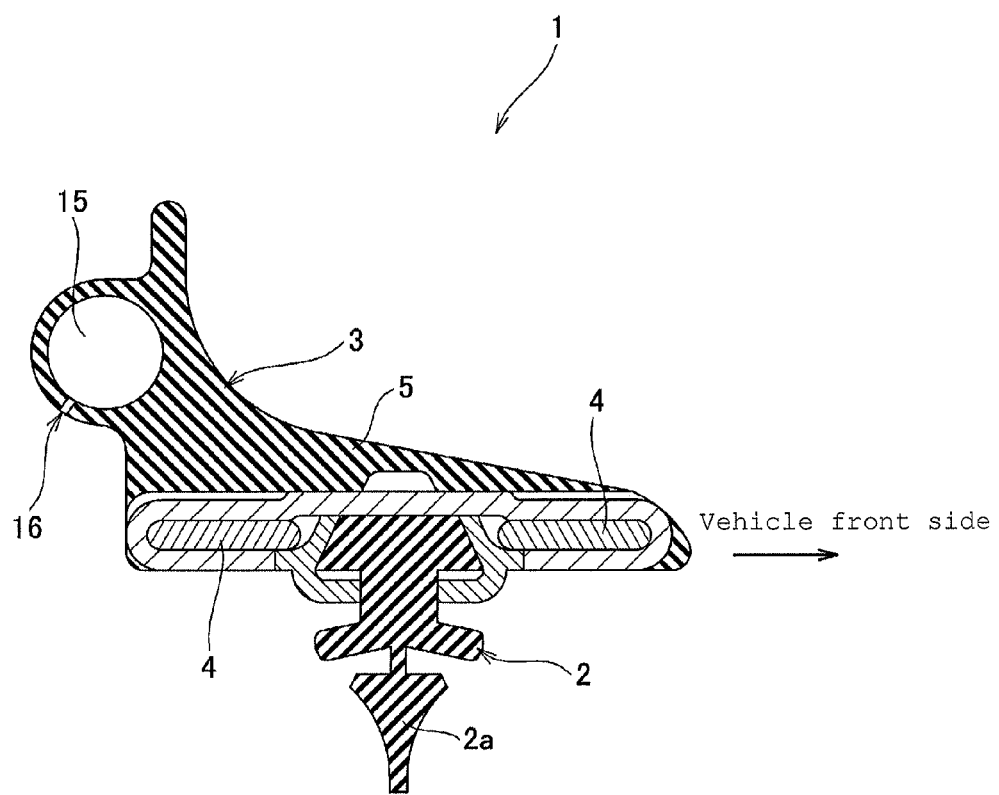

[FIG. 4]
(a)
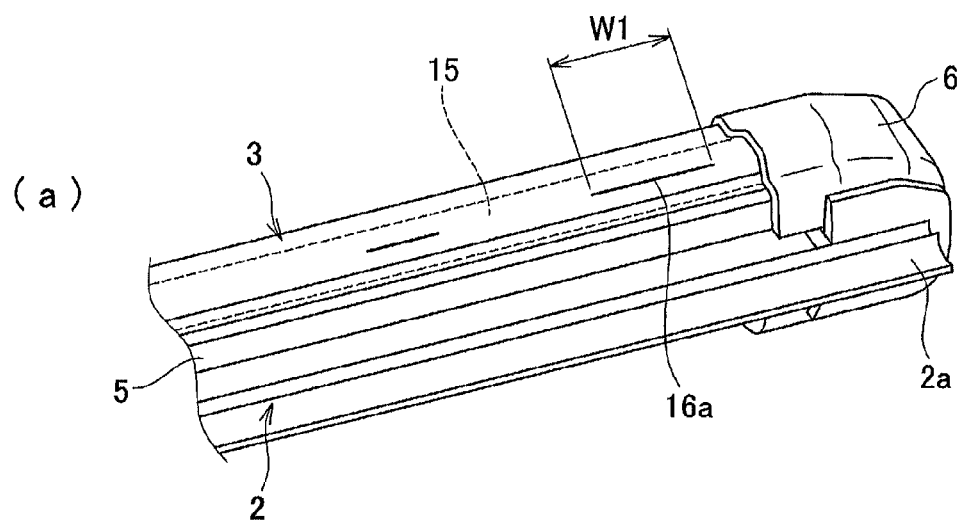
(b)
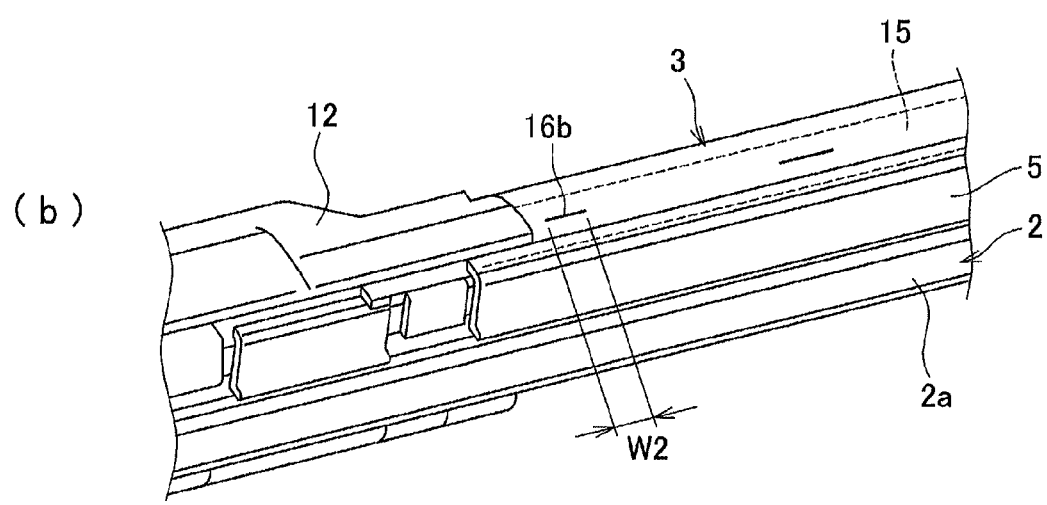

[FIG. 5]
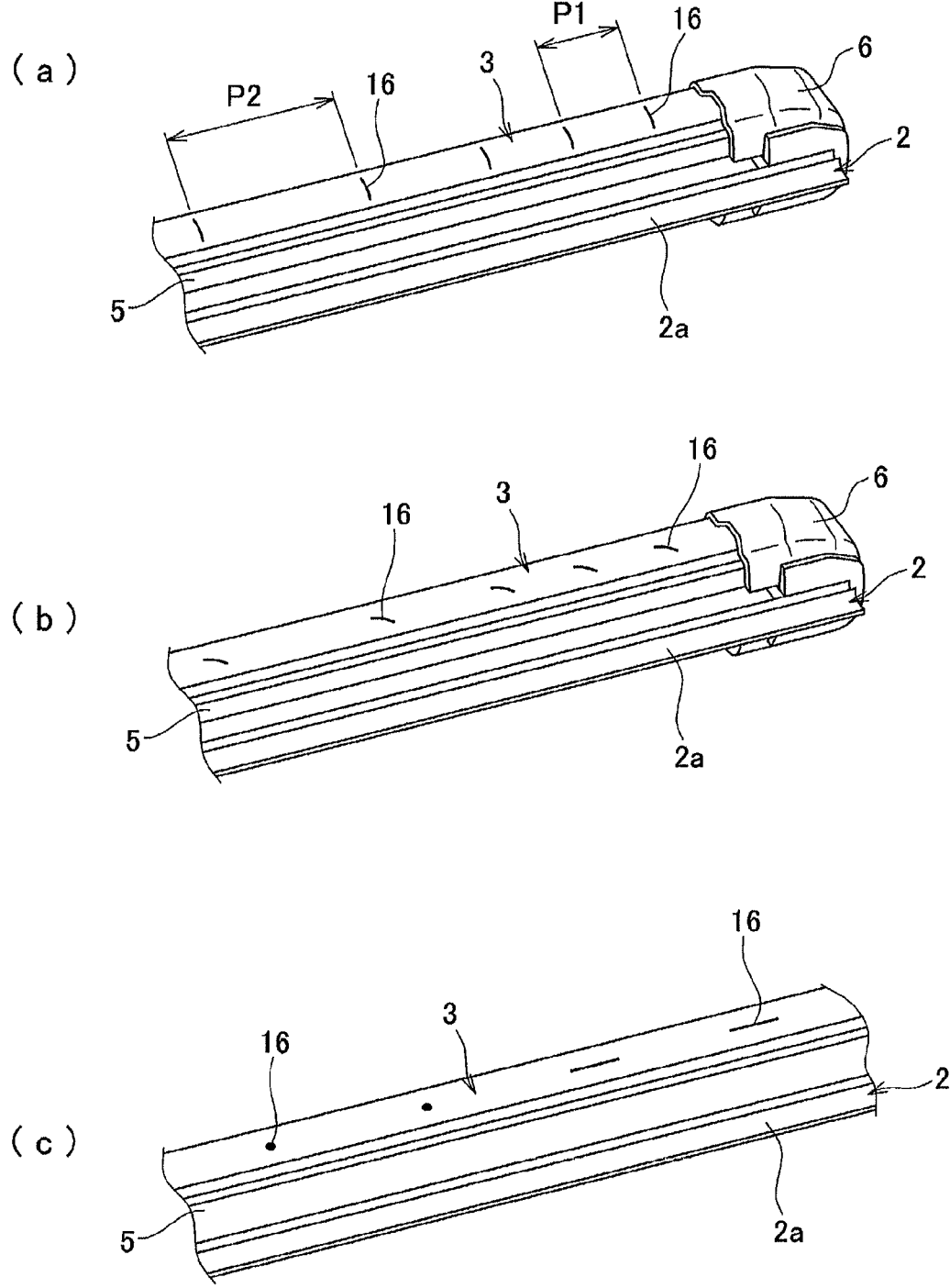

[FIG. 6]
(a) 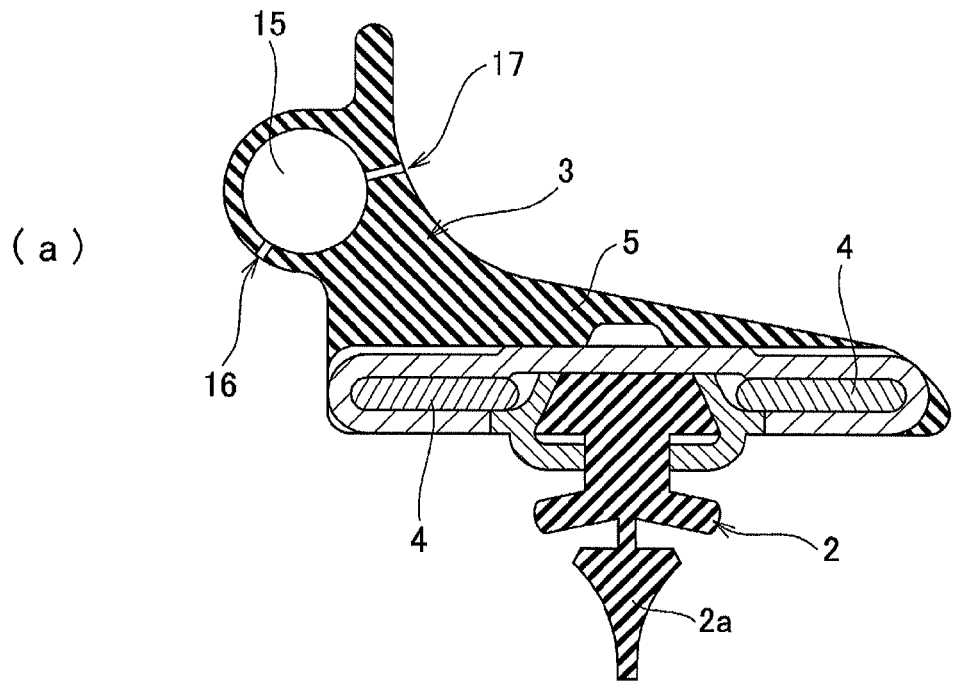
(b) 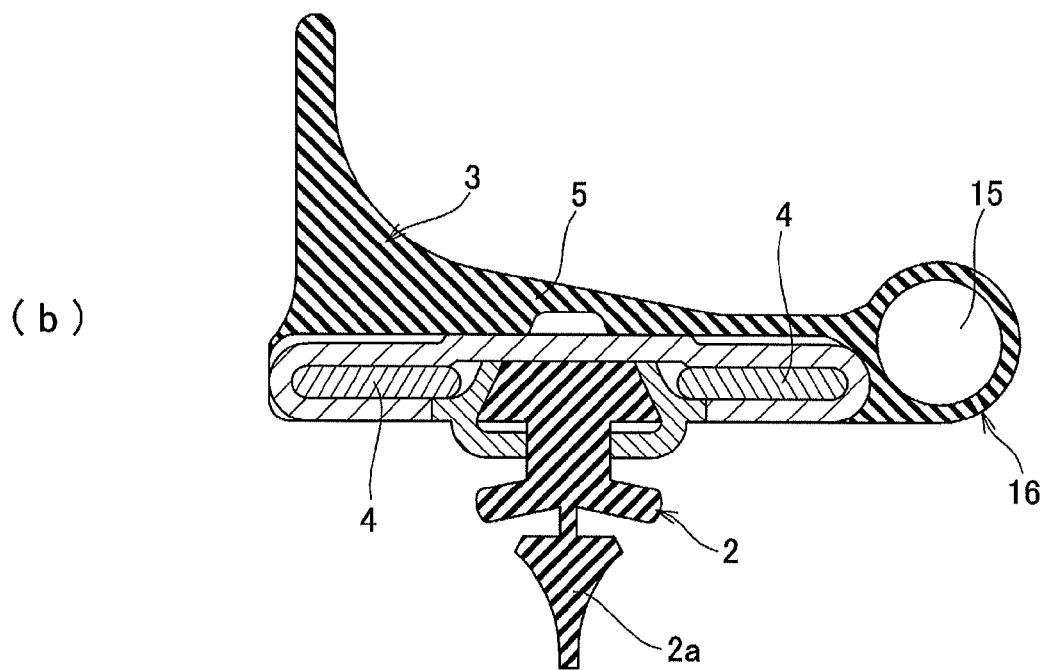

[FIG. 7]
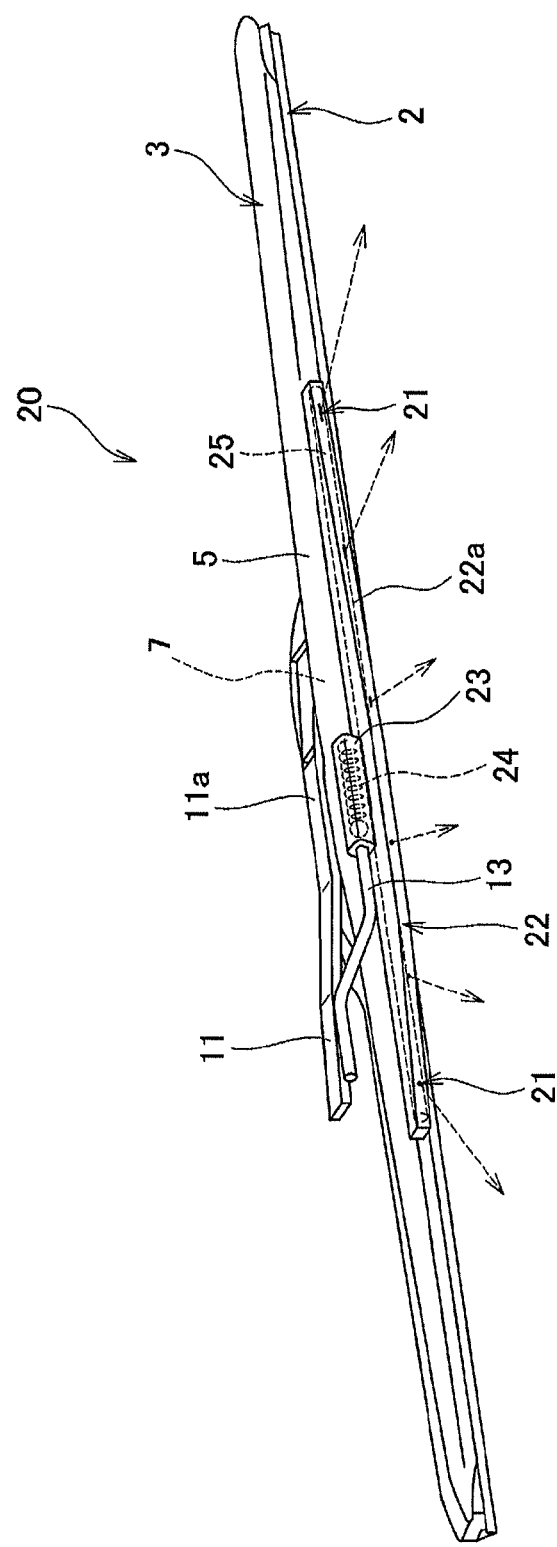

[FIG. 8]
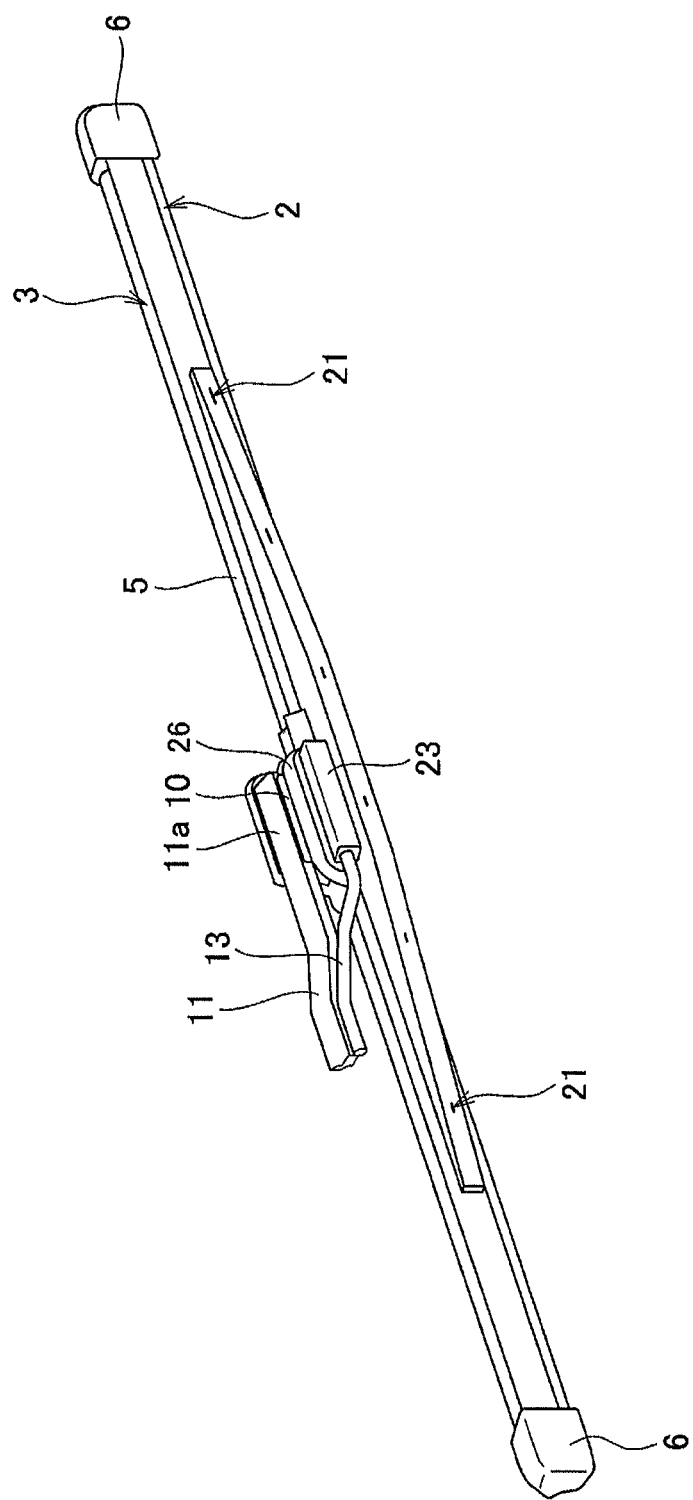

[FIG. 9]
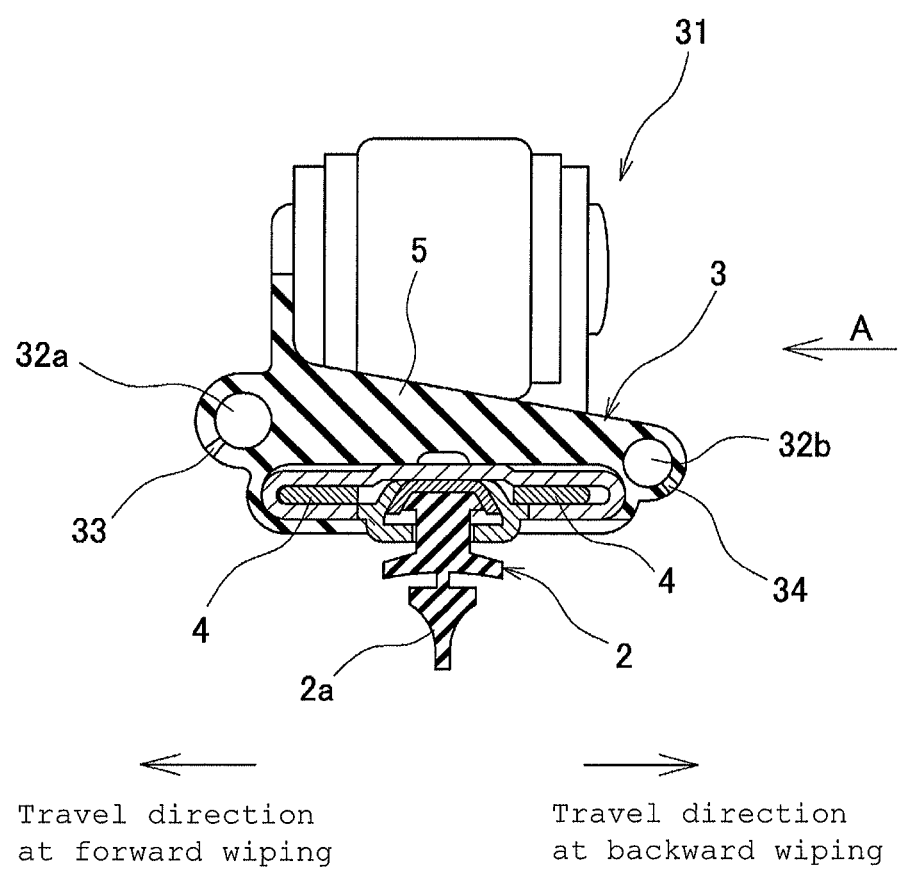
Travel direction
at forward wiping
Travel direction
at backward wiping

[FIG. 10]
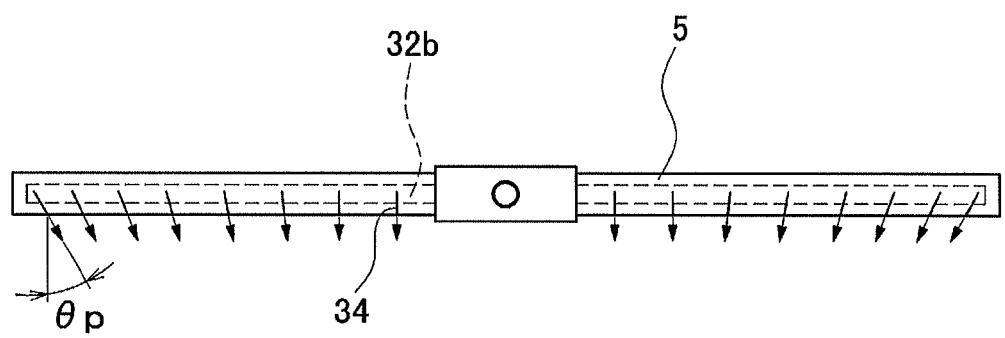

[FIG. 11]
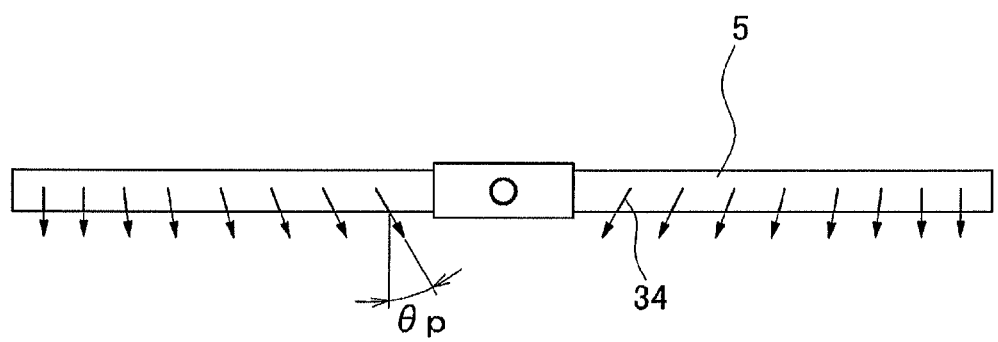
(a)
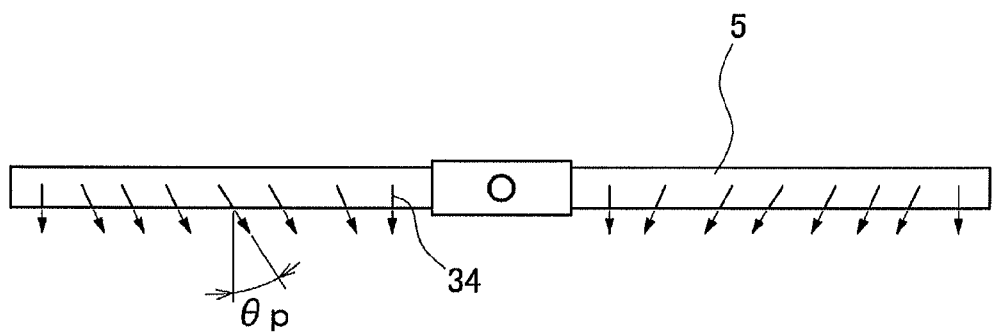
(b)

[FIG. 12]
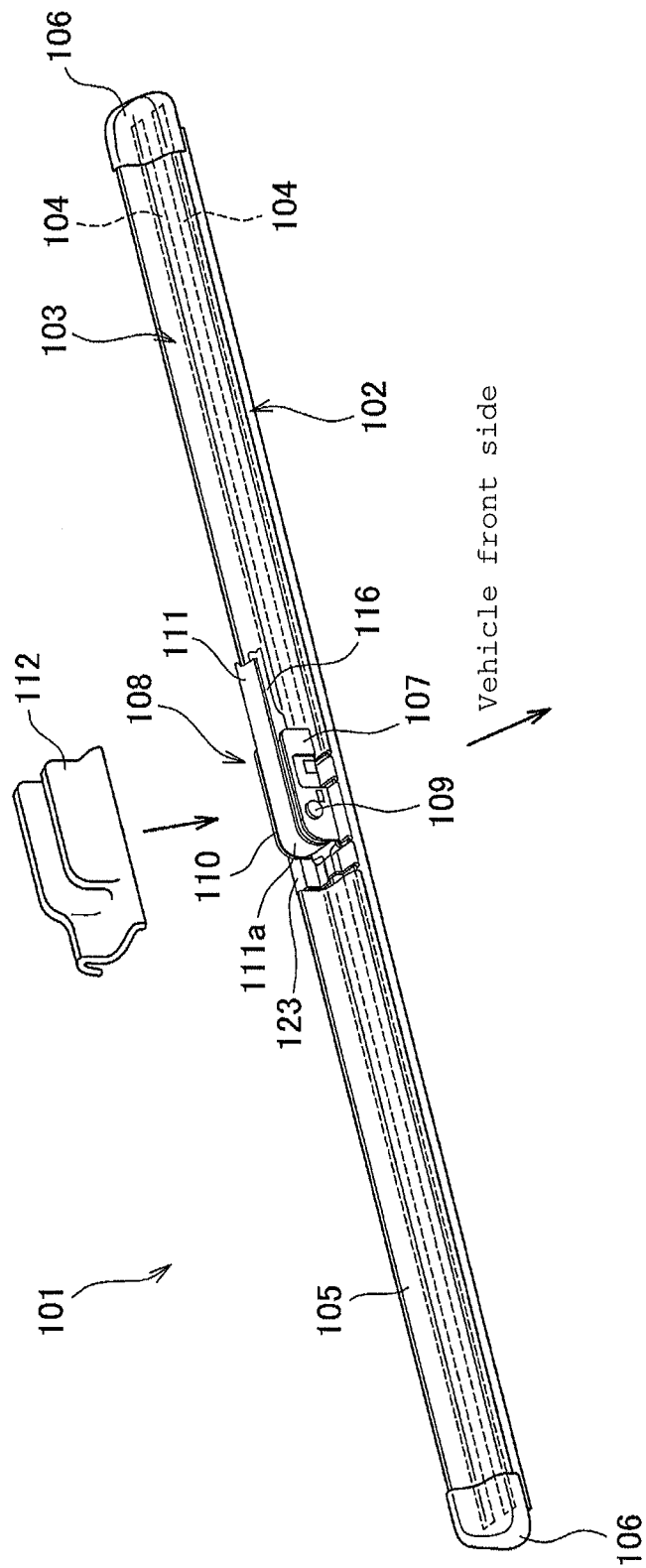

[FIG. 13]
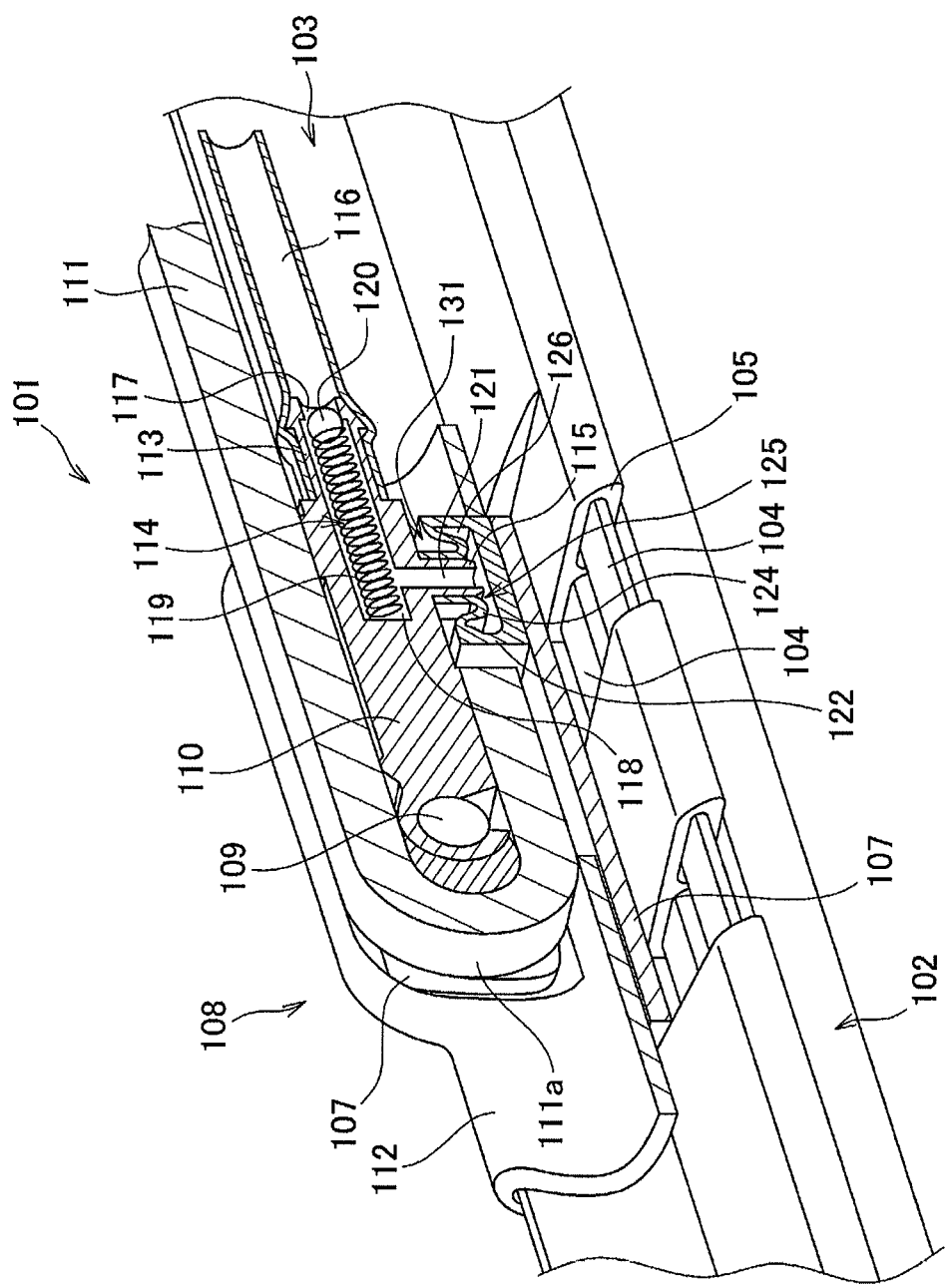

[FIG. 14]
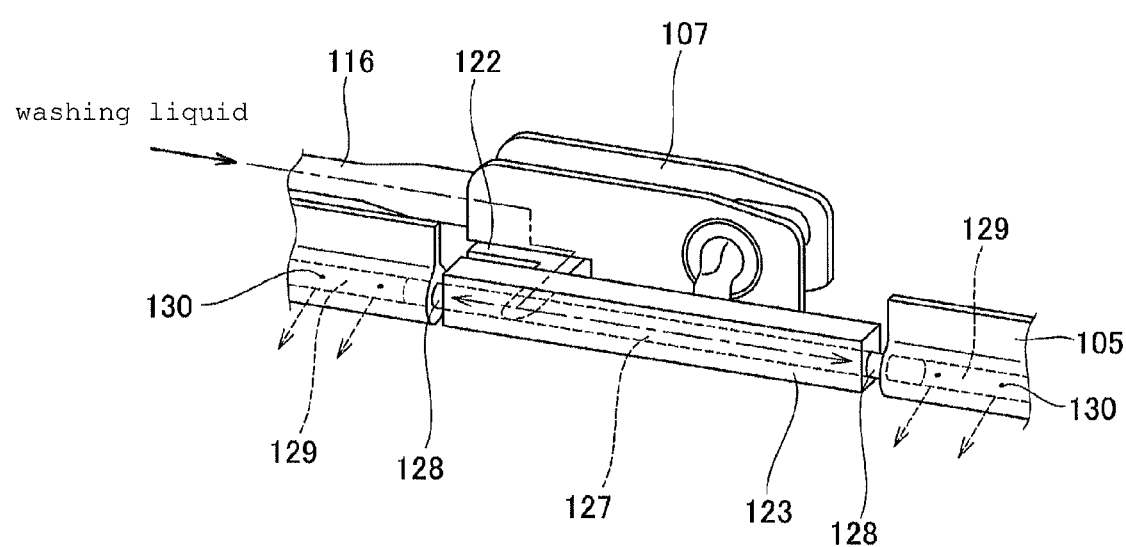

[FIG. 15]
(a) 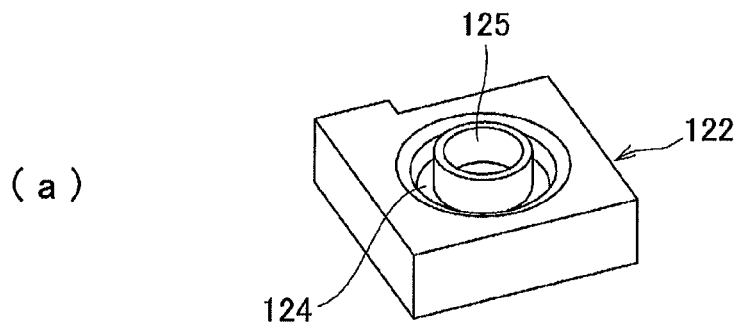
(b) 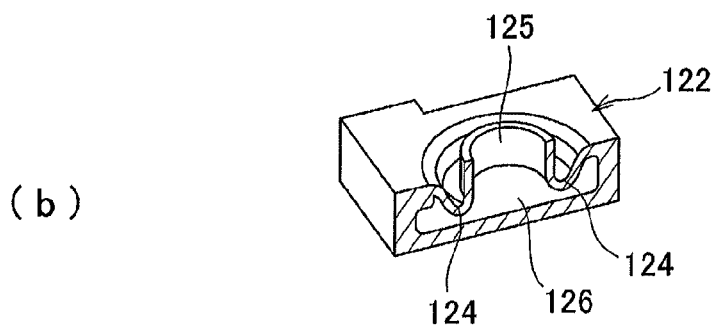
(c) 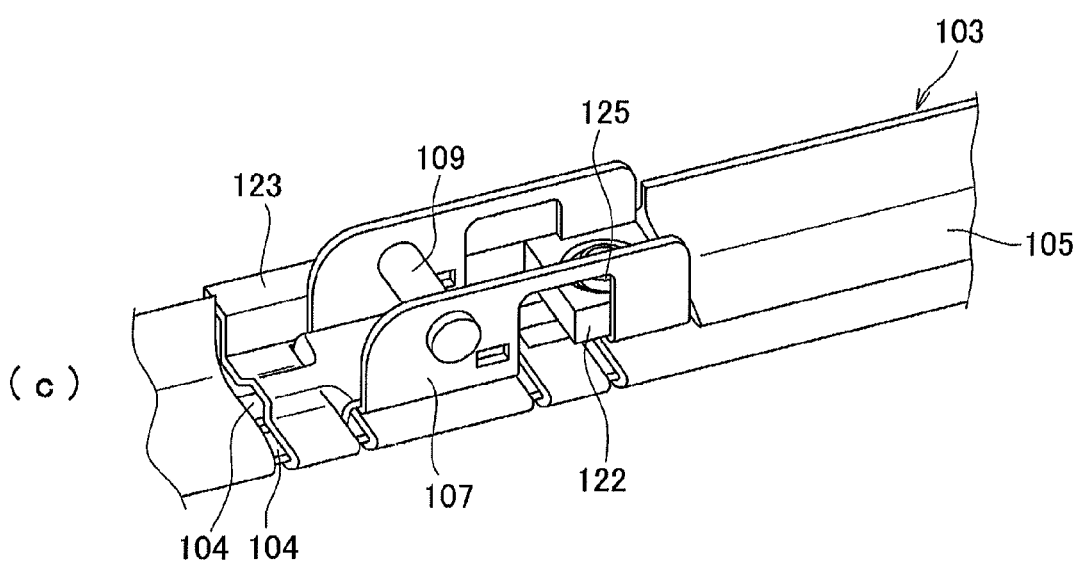

[FIG. 16]
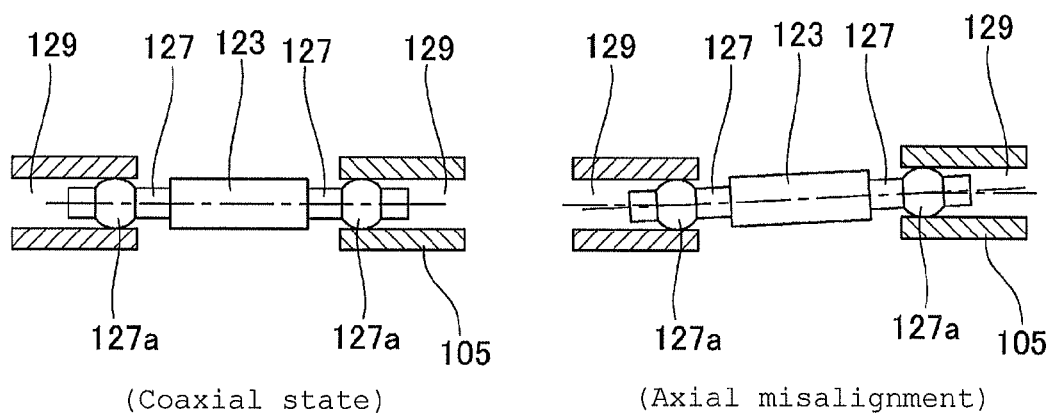
(Coaxial state)     (Axial misalignment)

[FIG. 17]
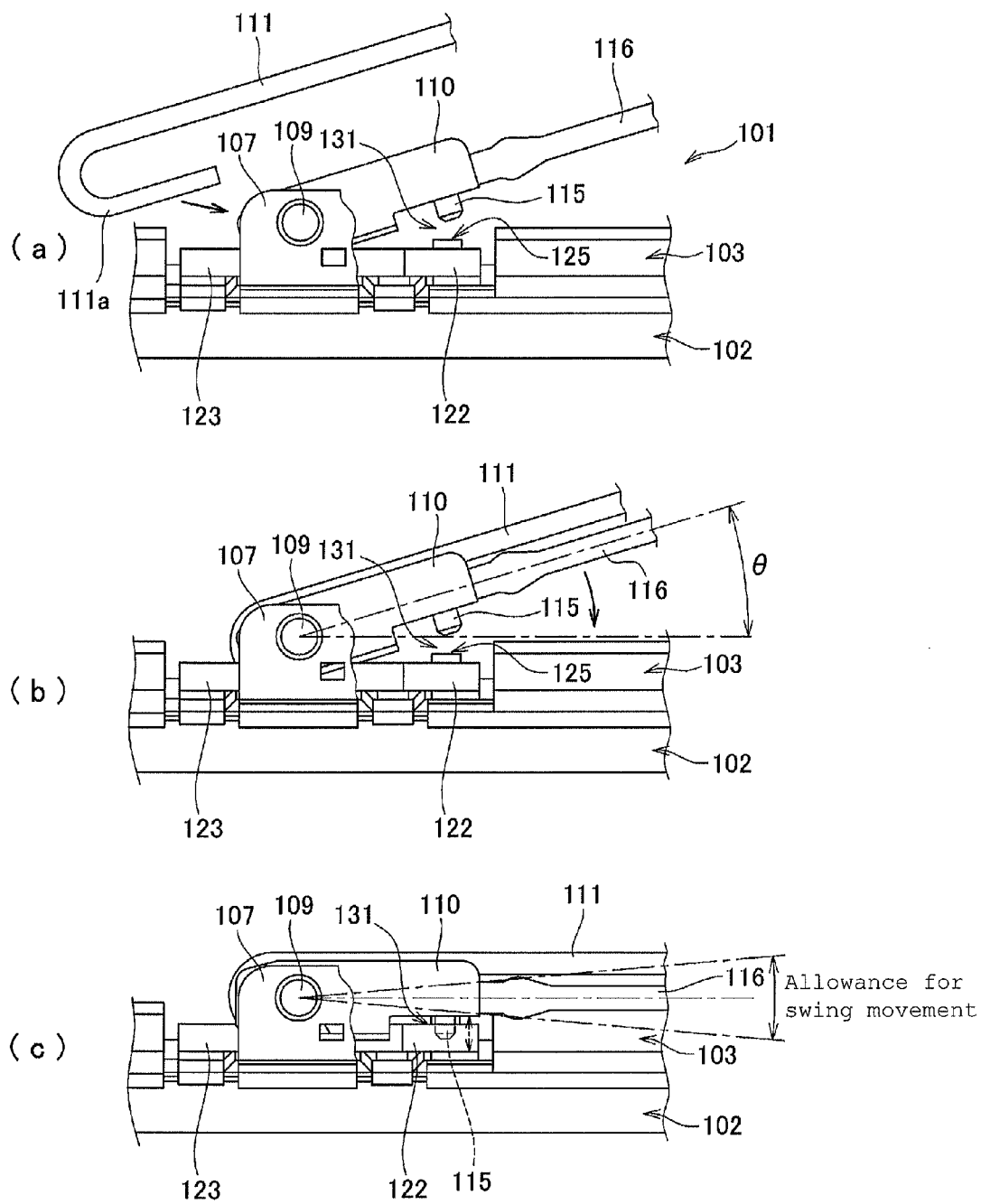

[FIG. 18]
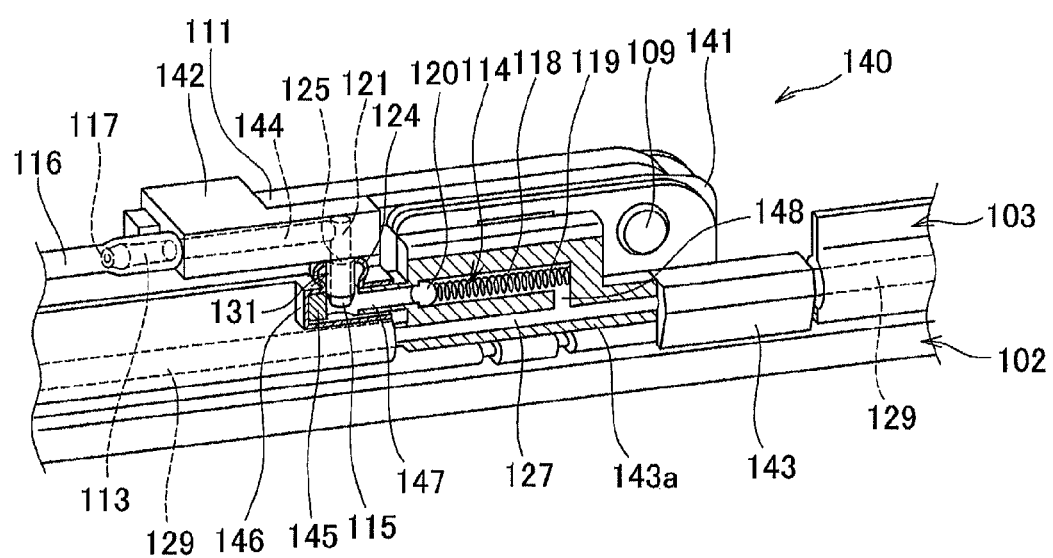

[FIG. 19]
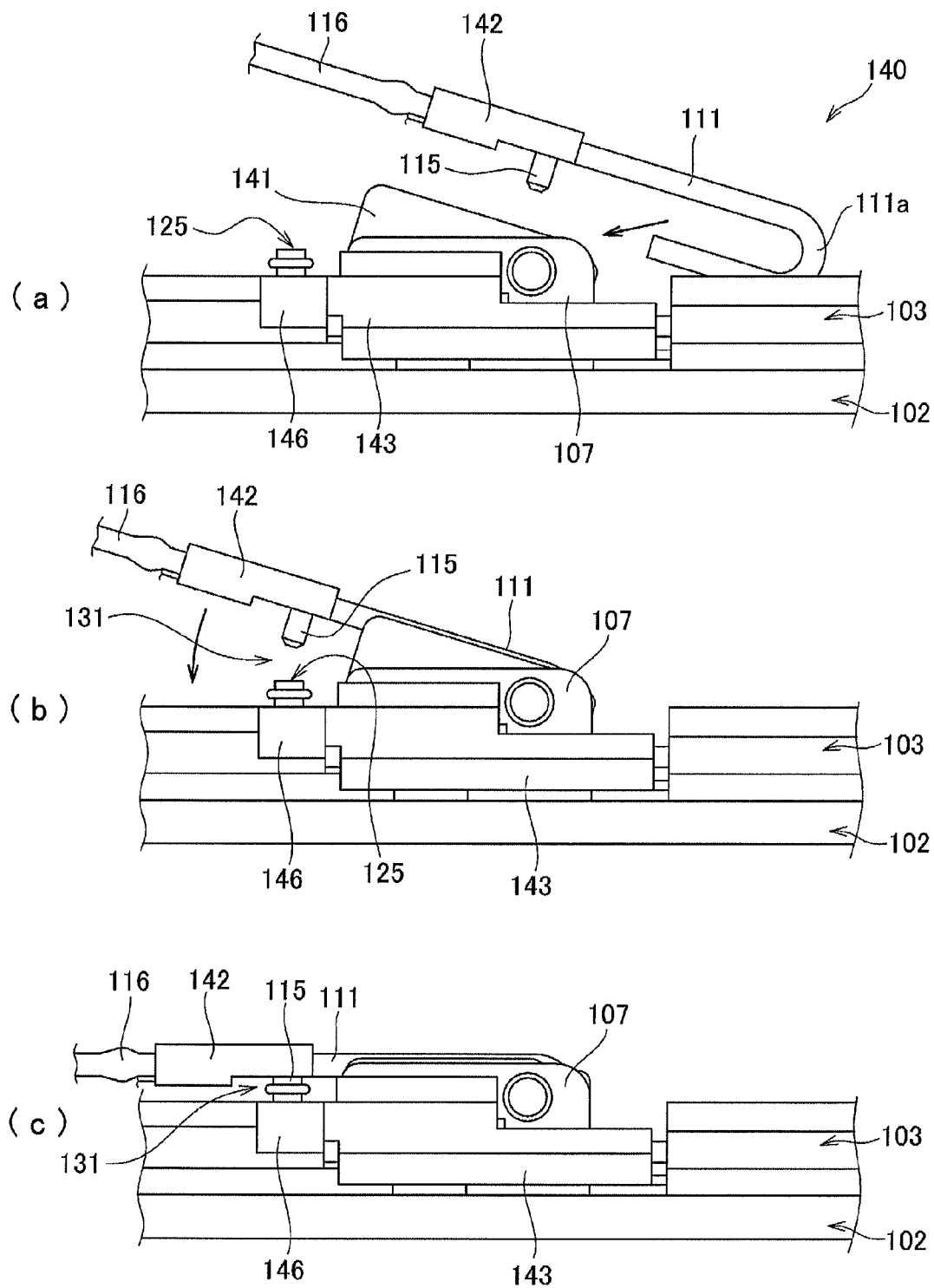

[FIG. 20]
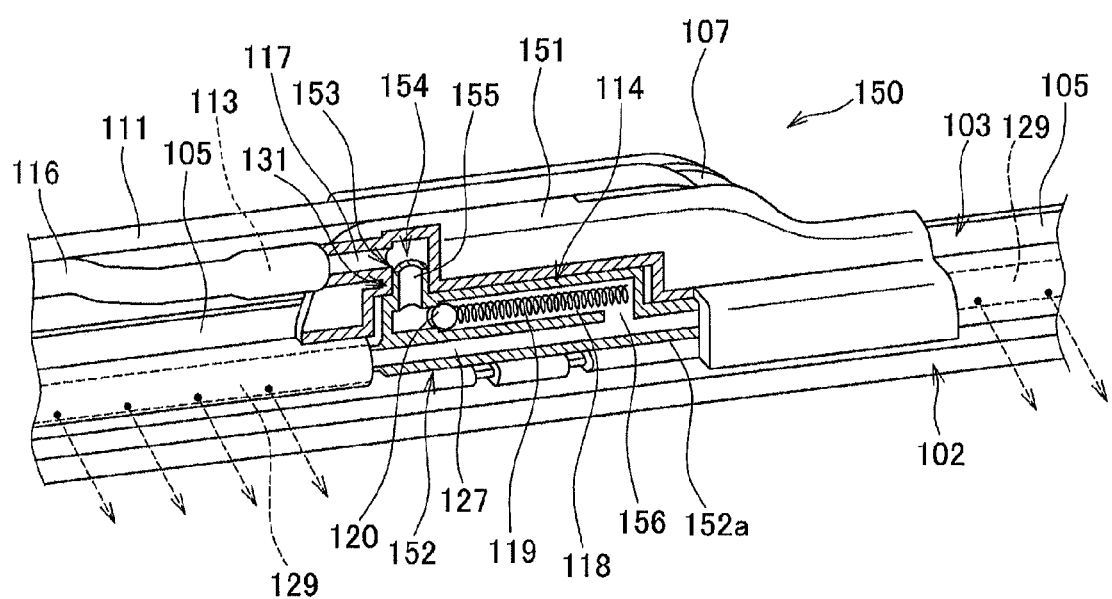

WIPER BLADE

TECHNICAL FIELD

The present invention relates to a wiper blade used in a vehicle wiper device and, more particularly, to an injection port structure in a wiper blade provided with an injection port of washing liquid (window washer fluid).

BACKGROUND ART

In general, a vehicle such as an automobile has mounted thereto a wiper device provided with a washer nozzle for washing liquid injection for the purpose of removing raindrop or washing out stains on a windshield. The washer nozzle is fitted to a front engine hood of the vehicle or a front hood thereof, and washing liquid is injected, at a predetermined timing, from the engine hood toward a window glass. The washing liquid is injected within a wiping area. However, not all the washing liquid is injected within the wiping area, but a part of the washing liquid may be injected to an unnecessary area outside the wiping area. Thus, in a conventional wiper device, excessive washing liquid is injected from the washer nozzle to a glass surface, deteriorating use efficiency of the washing liquid. Further, a large distance between the injection port of the washer nozzle and window glass easily causes displacement of an injection point due to wind pressure at high-speed running.

In recent years, as a countermeasure against the deterioration in use efficiency of the washing liquid or displacement of the injection point, there is proposed a wiper device in which an injection port or an injection nozzle (hereinafter, collectively referred to as "injection nozzle") is provided in a wiper blade itself. In such a wiper device, a water channel for the washing liquid and an injection nozzle are formed inside the blade. The wiper blade is connected with a water supply tube (water supply line) extending from a washing liquid tank. The water supply tube extends along a wiper arm and is connected to the wiper blade at a connection portion between the wiper arm and wiper blade. The washing liquid is injected from the injection nozzle formed in the wiper blade onto a window glass. At the time of wiping and washing, the washing liquid is supplied from a position extremely near a glass surface and is thus used efficiently. An increase in the use efficiency of the washing liquid leads to a size reduction of the washing liquid tank, which can in turn reduce a size and a weight of the vehicle.

Patent Document 1: Jpn. UM Appln. Laid-Open Publication No. S62-28662

DISCLOSURE OF THE INVENTION

Problems to be Solved by the Invention

However, a peripheral speed of the wiper blade varies at different points along a longitudinal direction of the wiper blade, and a wiping area also varies at different points along the longitudinal direction. That is, a rotation radius becomes larger toward an outside of the wiper blade and, accordingly, the peripheral speed becomes higher and wiping area becomes larger toward the outside. Therefore, a required amount of the washing liquid varies at different points on the wiper blade and, thus, a large number of injection nozzles need to be provided at a leading end of the wiper blade at which a large amount of the washing liquid is required.

An object of the present invention is to provide, in a wiper device that uses a wiper blade provided with an injection port of washing liquid, a wiper blade capable of injecting an adequate amount of washing liquid at each point on the wiper blade without significantly increasing the number of injection nozzles.

Means for Solving the Problems

A wiper blade according to the present invention is a wiper blade which is mounted to a leading end portion of a wiper arm, characterized by including: a blade rubber which is disposed on a wiper wiping surface; a rubber holder which holds the blade rubber and which is fitted to the wiper arm; a water channel which is provided along a longitudinal direction of the wiper blade and in which washing liquid is distributed; and a plurality of injection ports which are formed in the longitudinal direction of the wiper blade so as to make the water channel and an outside of the wiper blade communicate with each other and which are configured to be opened by water pressure of the washing liquid and inject the washing liquid, wherein an injection amount of the washing liquid to be injected from the injection ports varies along the longitudinal direction of the wiper blade.

In the present invention, an injection amount of the washing liquid may be varied along the longitudinal direction by varying a size of the injection ports along the longitudinal direction. The size of the injection ports may be set larger at an outer end side of the wiper blade than at an inner end side of the wiper blade. With this configuration, the injection amount of the washing liquid from the injection ports becomes larger toward the outer end side at which more washing liquid is required; while the washing liquid injection amount from the injection ports becomes smaller toward an inner end side at which less washing liquid is required.

Further, the injection amount of the washing liquid may be varied along the longitudinal direction by varying an arrangement pitch between the injection ports along the longitudinal direction. The arrangement pitch between the injection ports may be set larger at the inner end side of the wiper blade than at the outer end side of the wiper blade. With this configuration, the number of the injection ports becomes larger at a position closer to the outer end side at which more washing liquid is required and thus the injection amount of the washing liquid from the injection ports becomes larger toward the outer end side; while the number of the injection ports becomes smaller at a position closer to the inner end side at which less washing liquid is required and thus the washing liquid injection amount becomes smaller toward the inner end side.

In the present invention, the washing liquid is distributed in the water channel provided along the longitudinal direction of the wiper blade and is injected, by water pressure of the washing liquid itself, from a plurality of injection ports which are formed in the longitudinal direction onto the wiping surface. The injection ports are provided such that the size thereof or arrangement pitch therebetween varies along the longitudinal direction. As a result, the injection amount of the washing liquid varies from point to point along the longitudinal direction, allowing an adequate amount of the washing liquid to be injected at respective points.

In the wiper blade, the water channel may be provided inside the rubber holder so as to extend in the longitudinal direction, and the injection ports may be formed in the rubber holder. Further, the water channel may be provided inside a nozzle body which is fitted to the rubber holder, and the injection ports may be formed in the nozzle body.

In addition, the injection ports may each be formed into a slit shape, and the slit may be formed in the longitudinal direction, a blade travel direction, or an inclined direction. Further, the plurality of injection ports may be a combination of slits and holes.

The washing liquid used here refers not only to so-called window washer fluid obtained by dissolving a mixture of ethanol and surface acting agent in water but also to general liquid used for washing of the wiping surface, such as tap water or soapy water.

Further, the wiper blade mounted to the leading end portion of the wiper arm and having the injection ports each capable of injecting the washing liquid onto the wiper wiping surface may include a first joint member connected to a water supply line to which the washing liquid is supplied, a second joint member having a water channel communicating with the injection ports and removably fitted to the first joint member through a joint portion, and a check valve provided inside the first joint member or second joint member so as to prevent backflow of the washing liquid to the water supply line side. The joint portion may include a connection portion provided at the first joint member side and having a water channel communicating with the water supply line so as to allow the washing liquid to be distributed therein and a connected portion provided at the second joint member side so as to be removably fitted to the connection portion and connected to the water channel communicating with the injection ports.

In the above wiper blade, the detachable joint portion is provided between the first joint member connected with the water supply line and second joint member having the water channel communicating with the injection ports, so that the wiper blade with injection port can be mounted to the wiper arm without involving attachment/detachment of the water supply line. That is, simply by mounting the wiper blade to the wiper arm as in the case of normal blade replacement work, the water channels for the washing liquid are connected by the joint portion.

In the wiper blade, attachment/detachment between the connection portion and connected portion may be made with a motion of the wiper blade at attachment/detachment between the wiper arm and wiper blade.

Further, the wiper blade may be mounted to the wiper arm through a clip swingably fitted to the wiper blade, and the clip may be used as the first joint member. In this case, at removal of the wiper blade from the wiper arm, the connecting portion and connected portion are separated by rotating the wiper blade in a direction away from the wiper arm at a predetermined angle or larger to dispose the clip at an arm attachment/detachment position; while at attachment of the wiper blade to the wiper arm, the connecting portion and connected portion are connected by rotating the wiper blade in a direction approaching the wiper arm together with the clip to dispose the clip at a blade set position.

Further, a joint part fitted to the wiper arm may be used as the first joint member. In this case, at removal of the wiper blade from the wiper arm, the connecting portion and connected portion are separated by rotating the wiper blade in a direction away from the wiper arm at a predetermined angle or larger to dispose the joint part at an arm attachment/detachment position; while at attachment of the wiper blade to the wiper arm, the connecting portion and connected portion are connected by rotating the wiper blade in a direction approaching the wiper arm to dispose the joint part at a blade set position.

In addition, the first joint member may include, as the connecting portion, a joint protrusion having a water channel hole communicating with the water supply line, and the second joint member may include, as the connected portion, a protrusion receiving member having a protruding connection hole to which the joint protrusion is inserted/connected and an elastic portion vertically displaceable in a state where the joint protrusion is inserted into the protruding connection hole.

Further, the wiper blade may include an arm mounting portion to which the wiper arm is mounted and a cover member fitted to the arm mounting portion, and the cover member may be used as the first joint member. In this case, the first joint member may include, as the connecting portion, a connection hole communicating with the water supply line, and the second joint member may include, as the connected portion, a joint protrusion inserted/connected to the connection hole.

Advantages of the Invention

According to the wiper blade of the present invention, the water channel in which the washing liquid is distributed is provided along the longitudinal direction of the wiper blade, and the plurality of injection ports of the washing liquid are formed along the longitudinal direction of the wiper blade. The injection ports are provided such that the size thereof or arrangement pitch therebetween varies along the longitudinal direction. As a result, the injection amount of the washing liquid can be made to vary from point to point along the longitudinal direction, allowing an adequate amount of the washing liquid to be injected at respective points in the longitudinal direction, which results in improvement in washing efficiency. This eliminates the need to mount a large number of the injection ports at the leading end, whereby a configuration in which an optimum amount of the washing liquid can be injected according to the blade position can be obtained with a simple device structure.

BRIEF DESCRIPTION OF THE DRAWINGS

FIG. 1 is a perspective view illustrating a configuration of a wiper blade according to a first embodiment of the present invention.

FIG. 2 is a perspective view of the wiper blade in a state where an X surface denoted by an arrow in FIG. 1 faces upward.

FIG. 3 is an explanatory view illustrating a cross-sectional configuration of the wiper blade of FIG. 1.

FIG. 4A is an enlarged view illustrating an A part of FIG. 2, and FIG. 4B is an enlarged view illustrating a B part of FIG. 2.

FIGS. 5A to 5C are explanatory views each illustrating a modification of a slit.

FIGS. 6A and 6B are explanatory views each illustrating a modification concerning an injection port and a water channel.

FIG. 7 is a perspective view illustrating a configuration of a wiper blade according to a second embodiment of the present invention.

FIG. 8 is an explanatory view illustrating a modification of the wiper blade according to the present invention.

FIG. 9 is an explanatory view illustrating a cross-sectional configuration of a wiper blade according to a third embodiment of the present invention.

FIG. 10 is an explanatory view illustrating the configuration of the wiper blade of FIG. 9 as viewed from a direction denoted by an arrow A.

FIG. 11 is an explanatory view illustrating a modification of the wiper blade according to the third embodiment of the present invention.

FIG. 12 is a perspective view illustrating a configuration of the wiper blade according to a fourth embodiment of the present invention.

FIG. 13 is an explanatory view illustrating a cross-sectional configuration of a center portion of the wiper blade of FIG. 12.

FIG. 14 is an explanatory view illustrating a configuration of the center portion of the wiper blade of FIG. 12.

FIG. 15A is a perspective view illustrating a configuration of a protrusion receiving member, FIG. 15B is an explanatory view illustrating a cross-sectional configuration of the protrusion receiving member, and FIG. 15C is an explanatory view illustrating an arrangement state of the protrusion receiving member.

FIG. 16 is an explanatory view illustrating a configuration of a water channel connection portion of a water channel connector.

FIGS. 17A to 17C are explanatory views illustrating a procedure of mounting the wiper blade of FIG. 12 to a wiper arm.

FIG. 18 is an explanatory view illustrating a main part of a wiper blade according to a fifth embodiment of the present invention.

FIGS. 19A to 19C are explanatory views illustrating a procedure of mounting the wiper blade of FIG. 18 to the wiper arm.

FIG. 20 is an explanatory view illustrating a main part of a wiper blade according to a sixth embodiment of the present invention.

EXPLANATION OF REFERENCE SYMBOLS

1: Wiper blade
2: Blade rubber
2a: Wiping portion
3: Rubber holder
4: Metal plate
5: Holder body
6: End cap
7: Center bracket
8: Arm mounting portion
9: Clip shaft
10: Clip
11: Wiper arm
11a: U-hook
12: Center cover
13: Water supply tube
14: Water channel connector
15: Water channel
16: Injection port
16a, 16b: Injection port
17: Injection port
20: Wiper blade
21: Injection port
22: Nozzle body
22a: Main body portion
23: Water supply tube attachment portion
24: Check valve
25: Water supply channel
W: Slit width
P: Injection port arrangement pitch
31: Wiper blade
32a, 32b: Water channel
33: Injection port (first injection port)
34: Injection port (second injection port)
101: Wiper blade
102: Blade rubber
103: Frame
104: Metal plate
105: Blade body
106: End cap
107: Center bracket
108: Arm mounting portion
109: Clip shaft
110: Clip (first joint member)
111: Wiper arm
111a: U-hook
112: Center cover (cover member)
113: Tube attachment portion
114: Check valve
115: Joint protrusion
116: Water supply tube (water supply line)
117: Opening hole
118: Valve hole
119: Spring
120: Ball
121: Water channel hole
122: Protrusion receiving member
123: Water channel connector (second joint member)
124: Elastic portion
125: Protruding connection hole
126: Internal space
127: Water supply channel
127a: Spherical joint portion
128: Water channel connection portion
129: Water channel
130: Injection port
131: Joint portion
140: Wiper blade
141: Clip
142: Joint part (first joint member)
143: Water channel connector (second joint member)
143a: Water channel connector main body
144: Communication channel
145: Receiving member fitting portion
146: Protrusion receiving member
147: Water supply channel
148: Communication channel
150: Wiper blade
151: Center cover (first joint member)
152: Water channel connector (second joint member)
152a: Water channel connector main body
153: Joint protrusion
154: Protruding connection hole
155: Water channel hole
156: Communication channel

BEST MODE FOR CARRYING OUT THE INVENTION

Embodiments of the present invention will be described in detail with reference to the drawings.

First Embodiment

FIG. 1 is a perspective view illustrating a configuration of a wiper blade according to a first embodiment of the present invention. FIG. 2 is a perspective view of the wiper blade in a state where an X surface (surface at a rear side of a vehicle) denoted by an arrow in FIG. 1 faces upward. FIG. 3 is an explanatory view illustrating a cross-sectional configuration of the wiper blade of FIG. 1. As illustrated in FIGS. 1 and 2, a wiper blade 1 is so-called a flat-type wiper blade. The wiper blade 1 has a blade rubber 2 and a rubber holder 3 in an integrated manner. The wiper blade 1 is fitted to a windshield (surface to be wiped) of an automobile. The blade rubber 2 wipes the windshield with wiping operation to remove water droplets or stains.

The blade rubber 2 is a rubber member having a lip-shaped wiping portion 2a. The blade rubber 2 is disposed on a windshield surface so as to contact the glass surface. The rubber holder 3 has two metal plates 4 each extending in a longitudinal direction and a holder body 5 which is made of rubber and which covers the metal plates 4. The blade rubber 2 is fitted to a lower surface side of the rubber holder 3. The blade rubber 2 can be pulled out of the rubber holder 3 in the longitudinal direction so as to be replaceable when needed. End caps 6 are fitted to both ends of the rubber holder 3 so as to prevent the blade rubber 2 from coming away from the rubber holder 3.

An arm mounting portion 8 provided with a metal center bracket 7 is provided at a center of the rubber holder 3. The center bracket 7 has a substantially U-like shape cross section and is swaged to the metal plates 4. The center bracket 7 has a metal clip shaft 9. A clip (first joint member) 10 made of synthetic resin is rotatably fitted to the clip shaft 9. The clip 10 is accommodated in the center bracket 7 and can swing about the clip shaft 9. The center bracket 7 is fitted to a leading end portion (U-hook 11a) of a wiper arm 11 through the clip 10. The wiper blade 1 is fixed to the leading end of the wiper arm 11 so as to be swingable about the clip shaft 9. A center cover (cover member) 12 made of synthetic resin is fitted over the center bracket 7 so as to cover the same.

In the wiper blade 1, washing liquid is supplied through the clip 10. As illustrated in FIGS. 1 and 2, the clip 10 is attached with a water supply tube (water supply line) 13 made of synthetic resin or rubber. The water supply tube 13 is connected to a not illustrated washing liquid tank installed inside the vehicle. The clip 10 incorporates therein a not illustrated check valve constituted by a spring and a ball. Providing the check valve in the water supply channel prevents the washing liquid in the water supply tube 13 from flowing down to the washing liquid tank side even at the stop of water supply, with the result that the water supply tube 13 is maintained in a state of being filled with the washing liquid up to a blade side thereof. Thus, when the supply of the washing liquid is resumed, the washing liquid is immediately fed to the blade side to be injected onto the glass surface without time lag. The closer the check valve is to an injection position of the washing liquid is, the more effective such function of the check valve. In the wiper blade 1 of the present invention, by disposing the check valve inside the blade, the injection time lag is suppressed more effectively.

On the other hand, as illustrated in FIG. 1, a water channel connector 14 is provided beside the center bracket 7. A water channel 15 having a circular cross section is formed inside the rubber holder 3 of the wiper blade 1 along the longitudinal direction. Left and right water channels 15a and 15b are connected to both ends of the water channel connector 14, respectively. The washing liquid supplied through the water supply tube 13 passes through the clip 10 and water channel connector 14 and is distributed to the water channel 15 inside the holder body 5. In the rubber holder 3, a plurality of injection ports 16 communicating with the water channel 15 are arranged along the longitudinal direction. The washing liquid supplied to the water channel 15 is injected onto the glass surface through the injection ports 16.

Note that the cross section of the water channel 15 is not limited to the circular shape, but may be a polygon such as a quadrangle.

FIG. 4 is an explanatory view illustrating a configuration of the injection port 16. FIGS. 4A and 4B illustrate configurations of an A part (blade outer end portion) of FIG. 2 and a B part (blade center portion) of FIG. 2, respectively. As illustrated in FIGS. 4A and 4B, in the wiper blade 1, the injection port 16 is formed into a slit. The slit of the injection port 16 is formed by slitting up the holder body 5 along the blade longitudinal direction. Since the injection port of the washing liquid is preferably formed at a position as close as possible to the glass surface, the injection port 16 is formed at a lower side of the water channel 15. The slit of the injection port 16 is closed in a state where the washing liquid is not supplied (in a non-pressurized state) and, in this state, the washing liquid is retained in the water channel 15. When the washing liquid is supplied to the water channel 15, the injection port 16 is opened by water pressure of the washing liquid, and the washing liquid is injected from the injection port 16 toward the glass surface.

In the wiper blade 1, the injection port 16 closer to a blade leading end has a larger slit width W. That is, the width of an injection port 16a (width W1) of FIG. 4A is larger than the width of an injection port 16b (width W2) of FIG. 4B (W1>W2). As described above, in the wiper blade, the peripheral speed and wiping area vary along the longitudinal direction, so that a required amount of the washing liquid varies from point to point on the wiper blade, as described above. In order to cope with this, in the wiper bade 1, a size (opening amount) of the injection port 16 is made to vary from point to point on the blade to thereby adjust an injection amount of the washing liquid according to the required amount. Specifically, as described above, the injection port 16 closer to the outer end side is made to have a larger slit width so as to make the injection amount of the washer blade larger toward the leading end.

As a result, the washing liquid injection amount is larger toward the blade outer end side at which more washing liquid is required; while the washing liquid injection amount is smaller toward a blade inner end side at which less washing liquid is required. Thus, an adequate amount of the washing liquid can be injected at respective positions in the longitudinal direction of the wiper blade 1, thereby allowing washing efficiency to be improved. This further eliminates the need to mount a large number of the injection ports at the leading end, whereby a configuration in which an optimum amount of the washing liquid can be injected according to the blade position can be obtained with a simple device structure.

A shape of the injection port 16 is not limited to a horizontal slit extending along the longitudinal direction as illustrated in FIGS. 4A and 4B. For example, the injection port 16 may be realized by a vertical slit extending along a blade travel direction as illustrated in FIG. 5A or a diagonal slit as illustrated in FIG. 5B. Alternatively, the plurality of injection ports 16 may be a combination of holes and slits as illustrated in FIG. 5C. However, in the case of the vertical or diagonal slit, a limitation may be imposed on a slit length in terms of a blade width (height). Thus, as illustrated in FIG. 5A, an arrangement pitch P between the injection ports 16 is smaller toward the outer end side (P1<P2) to arrange more densely the injection ports, thereby adjusting the injection amount of the washing liquid. As a matter of course, also in a case where the injection port 16 is formed into the horizontal slit, the arrangement pitch of the injection port 16 can be varied to make the pitch smaller toward the outer end side.

Further, in the above embodiment, the injection port (first injection port) 16 is provided at a rear side (traveling direction side at forward wiping) of the wiper blade. In addition, as illustrated in FIG. 6A, another injection port (second injection port) 17 may be provided at a front side (traveling direction side at backward wiping). In this case, the washing liquid may be injected from the injection port 16 at the forward wiping and injected from the injection port 17 at the backward wiping. Further, a formation position of the water channel 15 of the rubber holder 3 is not limited to the position illustrated in FIG. 3. For example, the water channel 15 may be disposed at a blade front end as illustrated in FIG. 6B.

Second Embodiment

Next, a wiper blade 20 according to a second embodiment of the present invention will be described. FIG. 7 is an explanatory view illustrating a configuration of the wiper blade 20. As described above, the wiper blade 1 (first embodiment) has a configuration in which the injection ports 16 are provided in the wiper blade itself; however, in a conventional wiper device, there may be a case where the wiper blade cannot be easily replaced with the blade with injection ports depending on a vehicle type. The wiper blade 20 according to the second embodiment is useful for such a case. In the second embodiment, the blade with injection ports can be realized according to user's need by using aftermarket add-on parts and without changing the existing blade configuration. In the following embodiments, the same reference numerals are given to the same members or parts as in the first embodiment and a detailed description thereof will be omitted.

In the wiper blade 20, the center cover 12 used in the first embodiment is removed. A side surface of the center bracket 7 is covered by the holder body 5. As illustrated in FIG. 7, the wiper blade 20 has a configuration in which a nozzle body 22 having injection ports 21 is post-fitted to a vehicle rear side and integrated therewith. That is, the wiper blade 20 and the nozzle body 22 added on thereto constitute the wiper blade according to the present invention. The nozzle body 22 is fitted with a water supply tube attachment portion 23. The water supply tube attachment portion 23 is provided with the water supply tube 13. The water supply tube attachment portion 23 incorporates therein a check value 24. In a main body portion 22a of the nozzle body 22, a water supply channel 25 is formed in the longitudinal direction. The water supply channel 25 communicates with a rear stage side of the check valve 24. The main body portion 22a further has a plurality of slit-like injection ports 21. In the wiper blade 20, the washing liquid is supplied from the water supply channel 25 and is injected through the injection ports 21.

Also in the wiper blade 20, the slit width of the injection port 21 is made to vary from point to point on the blade to thereby adjust the injection amount of the washing liquid according to the required amount. Also in this case, the injection port 21 closer to the blade leading end has a larger slit with. Thus, the injection amount of the washer liquid is adjusted to be larger toward the outer end portion. The slit of the injection port 21 may be formed to extend horizontally, vertically, and diagonally, and may be combined with holes as in the case of the first embodiment. Thus, in the wiper blade 20, the blade with injection ports can be obtained without changing the configuration of a conventional wiper blade. Further, an adequate amount of the washing liquid can be injected at respective positions in the longitudinal direction, thereby allowing washing efficiency to be improved.

In the second embodiment, the nozzle body 22 is post-fitted as a separate member to the wiper blade 20 from which the center cover 12 is removed; however, as illustrated in FIG. 8, the center cover may be used in the wiper blade 20. That is, a cover nozzle 26 obtained by adding nozzle function of the nozzle body 22 to the center cover 12 of the first embodiment may be used. In the wiper blade of FIG. 8, the blade with injection ports can be realized by replacement of the center cover.

Third Embodiment

FIG. 9 is an explanatory view illustrating a cross-sectional configuration of a wiper blade 31 according to a third embodiment of the present invention. FIG. 10 is an explanatory view illustrating the configuration of the wiper blade of FIG. 9 as viewed from a direction denoted by an arrow A. As illustrated in FIG. 9, in the wiper blade 31, two water channels 32a and 32b are provided in the rubber holder 3. The water channel 32a is formed at the rear side (traveling direction side at forward wiping) of the wiper blade 1. The water channel 32b is formed at the front side (traveling direction side at backward wiping) of the wiper blade 1. The water channel 32a has formed therein a slit-like injection port (first injection port) 33. The water channel 32b has formed therein a slit-like injection port (second injection port) 34. In the wiper blade 31, an injection direction of the washing liquid is changed over depending on the blade travel direction. At the forward wiping, the washing liquid is injected from the injection port 33, while at the backward wiping, the washing liquid is injected from the injection port 34.

Also in the wiper device of a type in which the washing liquid is injected from the blade, there may be a case where large wind pressure in running scatters the washing liquid before the washing liquid reaches the glass surface, resulting in waste. This phenomenon occurs often at the backward wiping. This is because a fin provided in the blade diminishes influence of an air flow acting on a forward wiping side, whereas a backward wiping side has less effect of the fin, so that the injected liquid is raised and does not reach a predetermined position. In the wiper blade 31, in order to prevent the washing liquid from scattered, the slit (hole) of the injection port 34 at the backward wiping side is angled. Note that the slit of the injection port 33 at the forward wiping side is not angled (substantially parallel to the blade travel direction).

As illustrated in FIG. 10, an angle θp (inclination angle relative to the blade travel direction) of the injection port 34 is set larger at the blade outside. That is, the angle θp of the injection port 34 is made larger toward the blade outside. The injection port angle θp is appropriately set based on a vehicle type, a glass shape, a wiping pattern, and the like in consideration of scattering of water due to wind pressure. As illustrated in FIG. 10, when the injection ports 34 at the leading end side are inclined toward a center thereof, the washing liquid injected from the injection port 34 gathers on a blade center side. This suppresses scattering of the washing liquid, thereby ensuring an adequate injection position even at high-speed running.

Further, in the wiper blade 31, there is provided a difference in a discharge pressure of the washing liquid between the forward wiping and backward wiping (forward wiping<backward wiping). As described above, the washing liquid tends to be more scattered at the backward wiping. Thus, in the wiper blade 31, an injection pressure (injection speed) of the washing liquid at the backward wiping is increased to suppress the scattering of the washing liquid. The increase in the injection pressure of the washing liquid allows the washing liquid to reach the glass surface without being significantly scattered even with high wind pressure. Thus, even at the backward wiping where the washing liquid is more easily scattered, the scattering of the washing liquid is suppressed to ensure an adequate injection position even at high-speed running.

The injection port 34 is not limited to the configuration as illustrated in FIG. 10 in which the injection port at the blade outside is larger in the angle θp. FIG. 11 illustrates a modification of the third embodiment. As illustrated in FIG. 11A, the injection port 34 at a blade center side may be made larger in the angle θp. Alternatively, as illustrated in FIG. 11B, the angle θp of the injection port 34 may be set at random. That is, the position of the slit to be inclined at the angle θp, the number of slits to be inclined at the angle θp, and a value of the angle Op may be freely adjusted depending on a vehicle type, a glass shape, and a wiping pattern and the like.

Fourth Embodiment

In the wiper device having the configuration in which the injection ports are provided in the wiper blade, there exists a connection portion connecting the water supply tube and wiper blade, so that the water supply tube needs to be detached at replacement of the blade. At the replacement of the blade, the water supply tube is detached from the blade, followed by removal of the old wiper blade from the wiper arm. Then, a new wiper blade is mounted to the wiper arm and, thereafter, the water supply tube needs to be attached firmly to the blade side. As described above, at the replacement of the blade, attachment/detachment of the water supply tube needs to be performed in addition to a normal work flow, thus complicating the replacement work. Particularly, when the replacement work is done by a person in general, forgetting of detachment/attachment of the water supply tube, imperfect attachment of the water supply tube, or the like is expected to occur frequently. If the forgetting of detachment of the water supply tube occurs, the water supply tube may be damaged at the removal of the blade, or water leakage may occur.

Thus, in the following embodiments, there is provided, in a wiper device using the wiper blade provided with the injection port of the washing liquid, a water supply channel connection structure capable of easily and reliably connecting the water supply channel for the washing liquid and wiper blade without detachment/attachment work of the water supply tube.

FIG. 12 is a perspective view illustrating a configuration of the wiper blade according to a fourth embodiment of the present invention. As illustrated in FIG. 12, a wiper blade 101 is also a flat-type wiper blade and has the same basic configuration as that of the wiper blade 1 of the first embodiment. The wiper blade 101 also has a blade rubber 102 and a rubber holder 103 in an integrated manner.

Like the wiper blade 1 of the first embodiment, the blade rubber 102 is a rubber member having a lip-shaped wiping portion. The rubber holder 103 has two metal plates 104 and a holder body 105 made of rubber. End caps 106 are fitted to both ends of the rubber holder 103. An arm mounting portion 108 provided with a center bracket 107 is provided at a center of the rubber holder 103. The center bracket 107 has a clip shaft 109. A clip (first joint member) 110 is rotatably fitted to the clip shaft 109. The center bracket 107 is fitted to a leading end portion (U-hook 111a) of a wiper arm 111 through the clip 110. A center cover (cover member) 112 is fitted over the center bracket 107 so as to cover the same.

FIG. 13 is an explanatory view illustrating a cross-sectional configuration of a center portion of the wiper blade 101, and FIG. 14 is an explanatory view illustrating a configuration of the center portion of the wiper blade 101. In the wiper blade 101, the washing liquid is supplied through the clip 110. As illustrated in FIG. 13, the clip 110 has a tube attachment portion 113, a check valve 114, and a joint protrusion 115. The tube attachment portion 113 is attached with a water supply tube (water supply line) 116 made of synthetic resin or rubber. The water supply tube 116 is connected to a not illustrated washing liquid tank installed inside the vehicle. The tube attachment portion 113 has a hollow shape. An opening hole 117 is formed at a leading end side of the tube attachment portion 113. Further, inside the tube attachment portion 113, a valve hole 118 is provided over an inside of the clip 110. The opening hole 117 communicates with one end side of the valve hole 118. In the valve hole 118, a spring 119 and a ball 120 are accommodated to constitute the check valve 114.

In a non-pressurized state (in a state where the washing liquid is not supplied), the ball 120 of the check valve 114 is pressed against the opening hole 117 by biasing force of the spring 119. An inner diameter of the opening hole 117 is smaller than an outer diameter of the ball 120. In the non-pressurized state, the opening hole 117 is closed by the ball 120. This is a closed state of the check valve 114. When the washing liquid is supplied to allow the pressurized state to be reached to cause a water pressure of the washing liquid to go beyond the biasing force of the spring 119, the ball 120 is separated from the opening hole 117. As a result, the opening hole is opened. This is an opened state of the check valve 114. When the water supply is stopped, the check valve 114 is closed once again, and the blade side of the water supply tube is in a tightly closed state. Providing the check valve 114 in the water supply channel prevents the washing liquid in the water supply tube 116 from flowing down to the washing liquid tank side even at the stop of water supply, with the result that the water supply tube 116 is maintained in a state of being filled with the washing liquid up to the blade side thereof. Thus, as described above, the injection time lag is suppressed.

The joint protrusion 115 has a hollow shape and is formed so as to protrude downward from the clip 110. A water channel hole 121 is formed inside the joint protrusion 115. The water channel hole 121 communicates with the other end side of the valve hole 118. That is, the water channel hole 121 communicates with the opening hole 117 through the valve hole 118. When the check valve 114 is opened, the washing liquid is supplied from the water supply tube 116 to the water channel hole 121 through the opening hole 117 and valve hole 118.

As illustrated in FIG. 14, a water channel connector (second joint member) 123 having a protrusion receiving member 122 is provided beside the center bracket 107. FIG. 15A is a perspective view illustrating a configuration of the protrusion receiving member 122, FIG. 15B is an explanatory view illustrating a cross-sectional configuration of the protrusion receiving member 122, and FIG. 15C is an explanatory view illustrating an arrangement state of the protrusion receiving member 122. The protrusion receiving member 122 is formed of an elastic body such as rubber or synthetic resin. As illustrated in FIG. 15C, the protrusion receiving member 122 is disposed in the center bracket 107. The protrusion receiving member 122 has a bellows-like elastic portion 124. A protruding connection hole 125 is formed at a center of the elastic portion 124. An inside of the protrusion receiving member 122 is hollowed. An internal space 126 communicates with the protruding connection hole 125 inside the protrusion receiving member 122.

The protrusion receiving member 122 is connected to the water channel connector 123. The internal space 126 of the protrusion receiving member 122 communicates with a water supply channel 127 in the water channel connector 123. The water supply channel 127 extends in a longitudinal direction of the water channel connector 123 and opened to leading ends of water channel connection portions 128 formed so as to protrude from both sides thereof. A water channel 129 is formed inside the rubber holder 103. The water supply channel 127 communicates with the water channel 129 through the water channel connection portion 128. As illustrated in FIG. 16, a spherical joint portion 127a is provided in the water channel connection portion 128. An axial misalignment of the water channel 129 can be absorbed by the spherical joint portion 127a. A plurality of injection ports 130 communicating with the water channel 129 are formed in the rubber holder 103. The washing liquid supplied to the water channel 129 is injected from each injection port 130 to the glass surface.

In the wiper blade 101, a detachable joint portion 131 is formed between the clip 110 and water channel connector (second joint portion) 123. The joint portion 131 is constituted by a joint protrusion 115 (male side: connecting portion) formed at the clip 110 side and a protrusion receiving member (female side: connected portion) 122 fitted to the water channel connector 123. The joint protrusion 115 is inserted, from above, into the protruding connection hole 125 of the protrusion receiving member 122 and is retained in a close contact state. As a result, a water channel communicating from the water supply tube 116 to water channel connector 123 through the clip 110 and joint portion 131 is formed.

The washing liquid supplied, by means of the water supply tube 116, to the wiper blade 101 flows into the clip 110, joint portion 131, and water channel connector 123 in this order. Then, the washing liquid is distributed into left and right water channels 129 at the water channel connector 123 and is then injected onto the glass surface from each injection port 130. In each injection port 130, the washing liquid is injected immediately near a front side of the blade rubber 102 in the forward wiping direction. That is, the washing liquid is supplied from a position extremely near the glass surface. Thus, the glass surface can be wiped with effective use of the washing liquid.

In the joint portion 131, the protruding connection hole 125 is formed in the elastic portion 124. The joint protrusion 115 is connected to the protrusion receiving member 122 so as to be vertically movable by flexure of the elastic portion 124. Thus, even when the clip 110 vertically swings, the elastic portion 124 moves following the vertical swing. Consequently, even when the joint protrusion 115 moves vertically as denoted by a long dashed short dashed line of FIG. 17C with movement of the wiper arm 111, the joint protrusion 115 does not come off the protruding connection hole 125, thus allowing relative swing movement between the wiper arm 111 and wiper blade 101. In the wiper blade 101, a connection state between the joint protrusion 115 and protrusion receiving member 122 can be satisfactorily maintained even at the wiping operation. As a result, wiping operation of moving the wiper blade 101 along the glass surface can be achieved while reliably connecting the respective water supply channels for the washing liquid.

The following describes a procedure of mounting the thus configured wiper blade 101 to the wiper arm 111. FIGS. 17A to 17C are explanatory views illustrating a mounting procedure of the wiper blade. The wiper blade 101 is mounted to the wiper arm 111 which is in a raised position from the glass surface. First, as illustrated in FIG. 17A, the clip 110 is rotated to be lifted up to an arm mounting position. Then, the U-hook 111a of the wiper arm 111 is fitted to an outside of the clip 110. In this state, the joint protrusion 115 of the clip 110 side and protrusion receiving member 122 of the center bracket 107 side have not yet been connected. The joint protrusion 115 is positioned spaced apart from and above the protrusion receiving member 122 (FIG. 17B).

After the U-hook 111a is fitted into the clip 110, the wiper arm ill is laid down toward the glass surface side together with the wiper blade 101 to cause the wiper blade 101 to abut against the glass surface. The wiper blade 101 abutting against the glass surface is rotated in a direction approaching the wiper arm 111. At this time, as denoted by an arrow of FIG. 17B, the clip 110 is rotated about the clip shaft 109 together with the wiper arm 111 to be set at a blade set position. The clip 110 is in a state of being accommodated in the center bracket 107, that is, the wiper blade 101 is in a state of being able to perform wiping operation (FIG. 17C). When the clip 110 is accommodated in the center bracket 107 as illustrated in FIG. 17C, the joint protrusion 115 is inserted into the protrusion receiving member 122, and the joint protrusion 115 and protrusion receiving member 122 are automatically joined to each other. As a result, the joint protrusion 115 and protrusion receiving member 122 are connected in a close contact state. Then, the water supply channel for the washing liquid communicating from the water supply tube 116 to water channel 129 is formed.

In removing the wiper blade 101, the wiper arm 111 is raised from the glass surface. A positional relationship between the wiper blade 101 and wiper arm 111 when the wiper arm 111 is raised from the glass surface is in a state illustrated in FIG. 17C. Then, the wiper blade 101 is rotated about the clip shaft 109 so as to be separated from the wiper arm 111. The wiper blade 101 is rotated by a predetermined angle or larger (θ of FIG. 17B) so as to move the joint protrusion 115 beyond a flexure margin (dashed line arrow of FIG. 17(C)) of the elastic portion 124. Then, the joint protrusion 115 comes off the protrusion receiving member 122, and the joint protrusion 115 and protrusion receiving member 122 are in a separate state, as illustrated in FIG. 17B. In this state, the U-hook 111a of the wiper arm 111 is removed from the clip 110. As illustrated in FIG. 17A, the wiper blade 101 is separated from the wiper arm 111. Also when the wiper blade 101 is removed, the joint protrusion 115 automatically comes off the protrusion receiving member 122 with the removal of the wiper arm 111, in the same way as in mounting. Then, the water supply channels are separated from each other without direct handling of the water supply tube 116.

In the wiper blade 101, the one-touch joint portion 131 is provided between the clip 110 side and center bracket 107 side, so that replacement of the wiper blade with injection port can be easily performed without involving attachment/detachment of the water supply tube. That is, as in the case of normal blade replacement work, simply by fitting the wiper blade 101 to the wiper arm 111 having a common U clip structure, the water channels for the washing liquid are automatically connected. Thus, at the blade replacement, a complicated work of attachment/detachment of the water supply tube can be omitted, thereby improving work efficiency. Further, the wiper blade 101 can directly be mounted to the wiper arm having a common U clip structure, so that a component at the vehicle side need not be changed in accordance with the blade.

That is, according to the wiper blade 101, the detachable joint portion is provided between the first joint member connected with the water supply line and second joint member provided with the water channel communicating with the injection port, so that the wiper blade with injection port can be mounted to the wiper arm without involving attachment/detachment of the water supply line. Thus, at the blade replacement, a complicated work of attachment/detachment of the water supply tube can be omitted, thereby improving work efficiency.

Fifth Embodiment

Next, a wiper blade 140 according to a fifth embodiment of the present invention will be described. FIG. 18 is an explanatory view illustrating a main part of the wiper blade 140. In the following embodiments, the same reference numerals are given to the same members or parts as in the fourth embodiment and a detailed description thereof will be omitted.

In the above-described wiper blade 101 (fourth embodiment), the clip 110 provided with the check valve 114 and joint portion 131 is used; on the other hand, in this fifth embodiment, a conventional clip 141 is used. The check valve 114 and joint portion 131 are post-fitted as separate members. As illustrated in FIG. 18, in the wiper blade 140, a joint part (first joint member) 142 is fitted to the wiper arm 111 side. Further, the joint portion 131 is formed between the joint part 142 and a water channel connector (second joint member) 143 at the blade side. The check valve 114 is provided inside the water channel connector 143. The check valve 114 may be provided at the joint part 142 side.

The joint part 142 is fixed to the wiper arm 111. Like the above-described clip 110, the joint part 142 has the tube attachment portion 113 and joint protrusion 115. The opening hole 117 of the tube attachment portion 113 and water channel hole 121 inside the joint protrusion 115 are connected to each other through a communication channel 144 provided inside the joint part 142. On the other hand, in the water channel connector 143, a receiving member fitting portion 145 is formed in a protruding manner. The receiving member fitting portion 145 is fitted with a protrusion receiving member 146 having the bellows-like elastic portion 124. The protruding connection hole 125 is formed at the center of the elastic portion 124. The protruding connection hole 125 communicates with a water supply channel 147 inside the receiving member fitting portion 145. The protrusion receiving member 146 receives insertion of the joint protrusion 115 of the joint part 142 to be connected thereto. As described above, the protrusion receiving member 146 and joint protrusion 115 are connected so as to be vertically movable.

The water supply channel 147 inside the receiving member fitting portion 145 communicates with one end side of the valve hole 118 provided inside a water channel connector main body 143a. The spring 119 and ball 120 are accommodated in the valve hole 118. An inner diameter of the water supply channel 147 is smaller than the outer diameter of the ball 120. The spring 119 and ball 120 constitute the check valve 114. A communication channel 148 is provided at the other end side of the valve hole 118. The communication channel 148 communicates with the water supply channel 127 inside the water channel connector 143. The water supply channel 127 extends in a longitudinal direction of the water channel connector 143. Both ends of the water supply channel 127 are opened and each communicate with the water channel 129 formed inside the holder body 105.

As illustrated in FIGS. 19A to 19C, also in the wiper blade 140, the water channels for the washing liquid are automatically connected at the replacement of the wiper blade. Also in the case of the wiper blade 140, the clip 141 is lifted up as illustrated in FIG. 19A, and the U-hook 111a of the wiper arm 111 is fitted to an outside of the clip 141. In this state, the joint protrusion 115 of the joint part 142 side and protrusion receiving member 146 of the water channel connector 143 side have not yet been connected. The joint part 142 is disposed at the arm mounting position. The joint protrusion 115 is positioned spaced apart from and above the protrusion receiving member 146, as illustrated in FIG. 19B.

After the U-hook 111a is fitted into the clip 141, the wiper arm 111 is laid down toward the glass surface side. When the wiper blade 140 abuts against the glass surface, the clip 141 is rotated about the clip shaft 109 as denoted by an arrow of FIG. 19B to be set at the blade set position (FIG. 19C). Accordingly, the joint protrusion 115 is inserted into the protrusion receiving member 146, and the joint protrusion 115 and protrusion receiving member 146 are automatically joined to each other. As a result, the joint protrusion 115 and protrusion receiving member 146 are connected in a close contact state, whereby the water supply channel for the washing liquid communicating from the water supply tube 116 to water channel 129 is formed.

In the wiper blade 140, the joint part 142 is fitted to the wiper arm 111 side while the conventional clip 141 is employed. Further, the water channel connector 143 is fitted to the blade side. The joint part 142 and water channel connector 143 constitute the one-touch joint portion 131. With this configuration, there can be provided a wiper device capable of performing replacement of the wiper blade while utilizing a conventional product without involving attachment/detachment of the water supply tube. The wiper blade 140 employs the same U-hook structure as that of a conventional wiper device, so that equivalent strength and mounting accuracy to an existing product can be maintained.

Sixth Embodiment

As a sixth embodiment, a wiper blade 150 in which the water supply channels are connected by fitting of a center cover 151 will be described. In the wiper blade 150, the joint portion 131 is provided between a center cover (first joint member) 151 and a water channel connector (second joint member) 152. When the center cover 151 is fitted after the wiper blade 150 is mounted to the wiper arm 111, the joint portion 131 is brought into a connection state, whereby the water supply channels for the washing liquid are automatically connected.

FIG. 20 is an explanatory view illustrating a configuration of a main part of the wiper blade 150. As illustrated in FIG. 20, in the wiper blade 150, a joint protrusion 153 is provided at the water channel 152 side. The joint protrusion 153 and a protruding connection hole 154 (female side) at the center cover 151 side constitute the joint portion 131. That is, in contrast to the above fourth and fifth embodiments, the connecting portion of the first joint member functions as the female side, and the connected portion of the second joint member functions as the male side. Although the check valve 114 is provided inside the water channel connector 152 in the sixth embodiment, it may be provided inside the center cover 151, as described above.

In the water channel connector 152, the joint protrusion 153 is provided so as to protrude upward. A water channel hole 155 extending inside the joint protrusion 153 communicates with one end side of the valve hole 118 provided inside a water channel connector main body 152a. The spring 119 and ball 120 are accommodated in the valve hole 118. An inner diameter of the water channel hole 155 is smaller than the outer diameter of the ball 120. The spring 119 and ball 120 constitute the check valve 114. A communication channel 156 is provided at the other end side of the valve hole 118. The communication channel 156 communicates with the water supply channel 127 inside the water channel connector 152. The water supply channel 127 extends in a longitudinal direction of the water channel connector 152. Both ends of the water supply channel 127 are opened and each communicate with the water channel 129 formed inside the holder body 105.

On the other hand, the tube attachment portion 113 is provided at an end portion of the center cover 151 in a longitudinal direction thereof so as to protrude in the longitudinal direction. The opening hole 117 of the tube attachment portion 113 extends in the longitudinal direction. Inside the center cover 151, the opening hole 117 communicates with the protruding connection hole 154 vertically extending. The joint protrusion 153 of the water channel connector 152 is inserted and connected to the protruding connection hole 154.

In the wiper blade 150, the water supply channels for the washing liquid are connected by the joint portion 131 provided between the center cover 151 and water channel connector 152. As described above, also in the case of the wiper blade 150, the U-hook 111a of the wiper arm 111 is fitted into the clip 141 (conventional clip can be used) set at the arm mounting position, and the wiper arm 111 is laid down to the glass surface side to cause the wiper blade 150 to abut against the glass surface. At this time, the clip 141 is rotated about the clip shaft 109 to be set at the set position. Thereafter, the center cover 151 that has previously been fitted at this time point in the above embodiments is fitted to the center bracket 107. As a result, the joint protrusion 153 is inserted into the protruding connection portion 154 to thereby forming the water supply channel for the washing liquid communicating from the water supply tube 116 to water channel 129.

In the wiper blade 150 of the sixth embodiment, the joint portion 131 is provided between the center cover 151 and water channel connector 152. With this configuration, the center cover which is used generally in terms of design can be utilized as the joint portion. This eliminates the need to provide the joint part 142 used in the fifth embodiment, thereby reducing the number of components and increasing flexibility in layout of components. In the case of the wiper blade 150, an extra process of fitting the center cover 151 is added to the processes to be performed in each of the above embodiments; however, the added process is not the attachment/detachment of the tube to be performed in the conventional wiper blade and is thus easily performed and unlikely to be forgotten.

The present invention is not limited to the above embodiments and can be variously modified within the scope of the present invention.

For example, although the present invention is applied to the flat type wiper blade in the above embodiments, the present invention can be applied to so-called a tournament type wiper blade. Further, although the present invention is applied to the wiper blade of a wiper device for automobile in the above embodiment, the present invention can be applied to a wiper device to be mounted in various industrial machines such as a transporting machine and a constructing machine.

In the wiper blade of each of fourth to sixth embodiments, it is possible to arbitrarily determine which one of the first and second joint members is set to the male side (or female side). Thus, in the fourth and fifth embodiments, the connecting portion of the first joint member may be set as the female side, and the connected portion of the second joint member may be set as the male side. Further, in the sixth embodiment, the connecting portion of the first joint member may be set as the male side, and the connected portion of the second joint member may be set as the female side. That is, e.g., the fourth embodiment has a configuration in which the joint protrusion 115 is provided at the clip 110 side as the male side connecting portion, and the protrusion receiving member 122 is provided at the water channel connector 123 side as the female side connected portion; conversely, however, a female side member may be provided, as the connected portion, at a side of the clip 110 which is the first joint member, and a male side member may be provided, as the connecting portion, at a side of the water channel connector 123 which is the second joint member. Similarly, in the fifth and sixth embodiments, the male side and female side may be reversed.

The invention claimed is:

1. A wiper blade mounted to a leading end portion of a wiper arm, the wiper blade comprising:
   a blade rubber which is configured to be disposed on a wiper wiping surface;
   a rubber holder which holds the blade rubber and is fitted to the wiper arm;
   a first water channel extending along a longitudinal direction of the rubber holder and being configured such that washing liquid can be distributed therein;
   a second water channel extending along the longitudinal direction of the rubber holder and being configured such that washing liquid can be distributed therein;
   a first injection port defined in the rubber holder in the longitudinal direction thereof, the first injection port having a slit shape so as to make the first water channel and an outside of the wiper blade communicate with each other, and the first injection port being configured to be opened by water pressure of the washing liquid and inject the washing liquid; and
   second injection ports defined in the rubber holder in the longitudinal direction thereof, each of the second injection ports having a slit shape so as to make the second water channel and the outside of the wiper blade communicate with each other, and each of the second injection ports being configured to be opened by water pressure of the washing liquid and inject the washing liquid,
   wherein:
   the first water channel is positioned at a traveling direction side at forward wiping of the wiper blade,
   the second water channel is positioned at a traveling direction side at backward wiping of the wiper blade,
   at the forward wiping, the washing liquid is injected from the first injection port, and at the backward wiping, the washing liquid is injected from one of the second injection ports,
   arrangement pitches between the second injection ports vary along the longitudinal direction of the rubber holder and the arrangement pitch between two of the second injection ports at an outer end side of the wiper blade is smaller than the arrangement pitch between two of the second injection ports at an inner end side of the wiper blade such that an injection amount of the washing liquid to be injected from the second injection ports varies along the longitudinal direction of the rubber holder, each of the second injection ports is angled at an angle relative to a blade travel direction, the angle of one of the second injection ports at the outer end side of the wiper blade is larger than the angle of one of the second injection ports at the inner end side of the wiper blade such that the washing liquid injected from the second injection ports gathers on a blade center side, and an injection pressure of the washing liquid at the backward wiping is larger than an injection pressure of the washing liquid at the forward wiping so as to suppress scattering of the washing liquid due to wind pressure during running.

2. The wiper blade according to claim 1, wherein:

the wiper arm has a first joint member to which a water supply tube is connected, the first joint member has a joint protrusion configured to supply the washing liquid from the water supply tube to the water channel defined in the rubber holder, the rubber holder has a second joint member which receives the first joint member, the second joint member has a protruding connection hole which communicates with the water channel, and a water supply channel for the washing liquid communicating the water supply tube with the water channel is defined by connecting the joint protrusion to the protruding connection hole.

* * * * *